(12) United States Patent
Jamil et al.

(10) Patent No.: US 6,651,145 B1
(45) Date of Patent: Nov. 18, 2003

(54) METHOD AND APPARATUS FOR SCALABLE DISAMBIGUATED COHERENCE IN SHARED STORAGE HIERARCHIES

(75) Inventors: Sujat Jamil, Chandler, AZ (US); Hang Nguyen, Tempe, AZ (US); Quinn Merrell, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 260 days.

(21) Appl. No.: 09/677,122

(22) Filed: Sep. 29, 2000

(51) Int. Cl.$^7$ .............................................. G06F 12/08
(52) U.S. Cl. ...................... 711/144; 711/130; 711/141
(58) Field of Search ................................. 711/141, 130, 711/144

(56) References Cited

U.S. PATENT DOCUMENTS

| | | | |
|---|---|---|---|
| 5,241,664 A | * 8/1993 | Ohba et al. ................. | 711/121 |
| 5,524,212 A | * 6/1996 | Somani et al. .............. | 711/121 |
| 5,680,576 A | * 10/1997 | Laudon ...................... | 711/145 |
| 5,737,568 A | * 4/1998 | Hamaguchi et al. ........ | 711/121 |

FOREIGN PATENT DOCUMENTS

EP      0 397 994 A2    11/1990

OTHER PUBLICATIONS

Censier, L. M., et al., "A New Solution to Coherence Problems in Multicache Systems," IEEE Transactions on Computers, vol. C–27, No. 12, Dec. 1978, 7 pages.

Pong, F., et al., "Correctness of a Directory–Based Cache Coherence Protocol: Early Experience," IEEE, 1993, pp. 37–44.

PCT International Search Report, PCT/US01/30359, mailed Oct. 8, 2002, 5 pages.

Lilja, D. J.. Cache Coherence in Large–Scale Shared–Memory Multiprocessors: Issues and Comparisons, ACM Computing Surveys, 25(3), Sep. 1993.

M. Papamarcos and J. Patel, "A Low–Overhead Coherence Solution for Multiprocessors with Private Cache Memories," Proc. 11th ISCA, 1984 pp. 348–354.

IEEE Std 1596–1992. *Scalable Coherent Interface*. Piscataway, NJ.

R.E. Johnson. *Extending the Scalable Coherent Interface for Large–Scale Shared–Memory Multiprocessors*. PhD thesis, University of Wisconsin–Madison, 1993.

(List continued on next page.)

*Primary Examiner*—Kevin Verbrugge
(74) *Attorney, Agent, or Firm*—Blakely, Sokoloff, Taylor & Zafman LLP

(57) ABSTRACT

Scalable disambiguating accesses in multi-level cache hierarchies provides for improved system performance and reduced cost. Shared-storage provides portions to hold data and portions to hold corresponding status encodings. Status encodings provide information to disambiguate data requests to shared-storage without resorting to prior methods of snooping or transmitting backward status-inquiries to private-storage. Shared-storage transmits data in response to requests if its status encodings indicate no private copies of the requested data have been modified. Shared storage transmits data requests to private storage if corresponding status encodings indicate that copies of requested data in private storage have been modified. Private-storage provides coherent copies, and shared-storage proceeds to satisfy the requests. If requests indicate a need to modify data, shared storage provides invalidation transmissions to private storage holding copies of relevant data. Status encodings are then set to a dirty status for coherently processing future requests.

30 Claims, 17 Drawing Sheets

OTHER PUBLICATIONS

Kourosh Gharachorloo, Anoop Gupta, and John Hennessy. Performance Evaluation of Memory Consistency Models for Shared–Memory Multiprocessors. In *Proceedings of Fourth International Conference on Architectural Support for Programming Languages and Operating Systems*, pp. 245–257, 1991.

Kourosh Gharachorloo, Daniel Lenoski, James Laudon, Phillip Gibbons, Anoop Gupta, and John Hennessy. Memory Consistency and Event Ordering in Scalable Shared–Memory Multiprocessors. In *Proceedings of the 17th International Symposium on Computer Architecture*, pp. 15–26, May 1990.

Christoph Scheurich and Michel Dubois. Correct Memory Operation of Cache–Based Multiprocessors. In *Proceedings 14th Annual International Symposium on Computer Architecture*, pp. 234–243, Pittsburgh, PA, Jun. 1987.

A. Agarwal, D. Chaiken, G. D'Souza, et al. The MIT Alewife machine: A large–scale distributed–memory multiprocessor. Technical Report MIT/LCS Memo TM–454, Laboratory for Computer Science, Massachusetts Institute of Technology, 1991.

R. Bianchini, M. E. Crovella, L. Kontoothanassis, and T. J. LeBlanc. Memory contention in scalable cache–coherent multiprocessors. Technical Report 448, Computer Science Department, University of Rochester, 1993. Title Page missing.

K. Farkas, Z. Vranesic, and M. Stumm. Cache consistency in hierarchical–ring–based multiprocessors. Tech. Rep. CSRI–273, Computer Systems Research Institute, Univ. of Toronto, Ontario, Canada, Jan. 1993.

B. Fleisch and G. Popek. Mirage: A coherent distributed shared memory design. In *Proceedings from the 14th ACM Symposium on Operating System Principles*, pp. 211–223, New York, 1989.

S. Mori, H. Saito, M. Goshima, et al. A distributed shared memory multiprocessor: ASURA—memory and cache architectures–. In *Supercomputing '93*, pp. 740–749, Portland, Oregon, Nov. 1993.

K. Li and P. Hudak. Memory coherence in shared virtual memory systems. *ACM Transactions in Computer Systems*, 7(4):321–359, Nov. 1989.

Q. Li and S. Vlaovic. Redundant linked list based cache coherence protocol. In *World Computer Congress, IFIP Congress*, 1994.

John M. Mellor–Crummey and Michael L. Scott. Algorithms for scalable synchronization on shared–memory multiprocessors. *ACM Trans. on Computer Systems*, 9(1), Feb. 1991.

H. Nilsson and P. Stenstrom. The scalable tree protocol—a cache coherence approach to large–scale multiprocessors. In *Proceedings of the 4th IEEE Symposium on Parallel and Distributed Processing*, May 1992.

C.K. Tang. Cache system design in the tightly coupled multiprocessor system. In *AFIPS Proceedings of the National Computer Conference*, 1976.

Craig–Anderson and Jean–Loup Baer. Design and Evaluation of a Subblock Cache Coherence Protocol for Bus–Based Multiprocessors. University of Washington, 1994, 94–05–02.

Anderson, C. and J.–L. Baer. A Multi–Level Hierarchical Cache Coherence Protocol for Multiprocessors. University of Washington, 1992, 92–10–04.

D. Chaiken, J. Kubiatowicz, and A. Agarwal. LimitLESS directories: A scalable cache coherence scheme. In *Proc. of the Fourth Int'l Conf. on ASPLOS*, pp. 224–234, New York, Apr. 1991.

H. S. Sandhu, B. Gamsa, and S. Zhou. The shared regions approach to software cache coherence on multiprocessors. In *Proc. of the 4th ACM SIGPLAN Symp. on Principles and Practice of Parallel Programming*, May 1993.

S.J. Eggers and R.H. Katz. A characterization of sharing in parallel programs and its application to coherency protocol evaluation. In *Proceedings of the 15th Annual International Symposium on Computer Architecture*, May 1988.

D. Lenoski et al. The directory–based cache coherence protocol for the dash multiprocessor. In *Proc. 17th Int'l Symp. Computer Architecture*, Los Alamitos, Calif., May 1990.

Bill Nitzberg and Virginia Lo. Distributed shared memory: A survey of issues and algorithms. *IEEE Computer*, pp. 52–60, Aug. 1991.

M. Stumm and S. Zhou. Algorithms implementing distributed shared memory. *Computer*, 23(5):54–64, May 1990.

M. Thapar and B. Delagi. Stanford distributed directory protocol. *IEEE Computer*, pp. 78–80, Jun. 1990.

Shreekant Thakkar, Michel Dubios, Anthony T. Laundrie, and Gurindar S. Sohi. Scalable Shared–Memory Multiprocessor Architectures. IEEE Computer, 23(6), Jun. 1990.

* cited by examiner

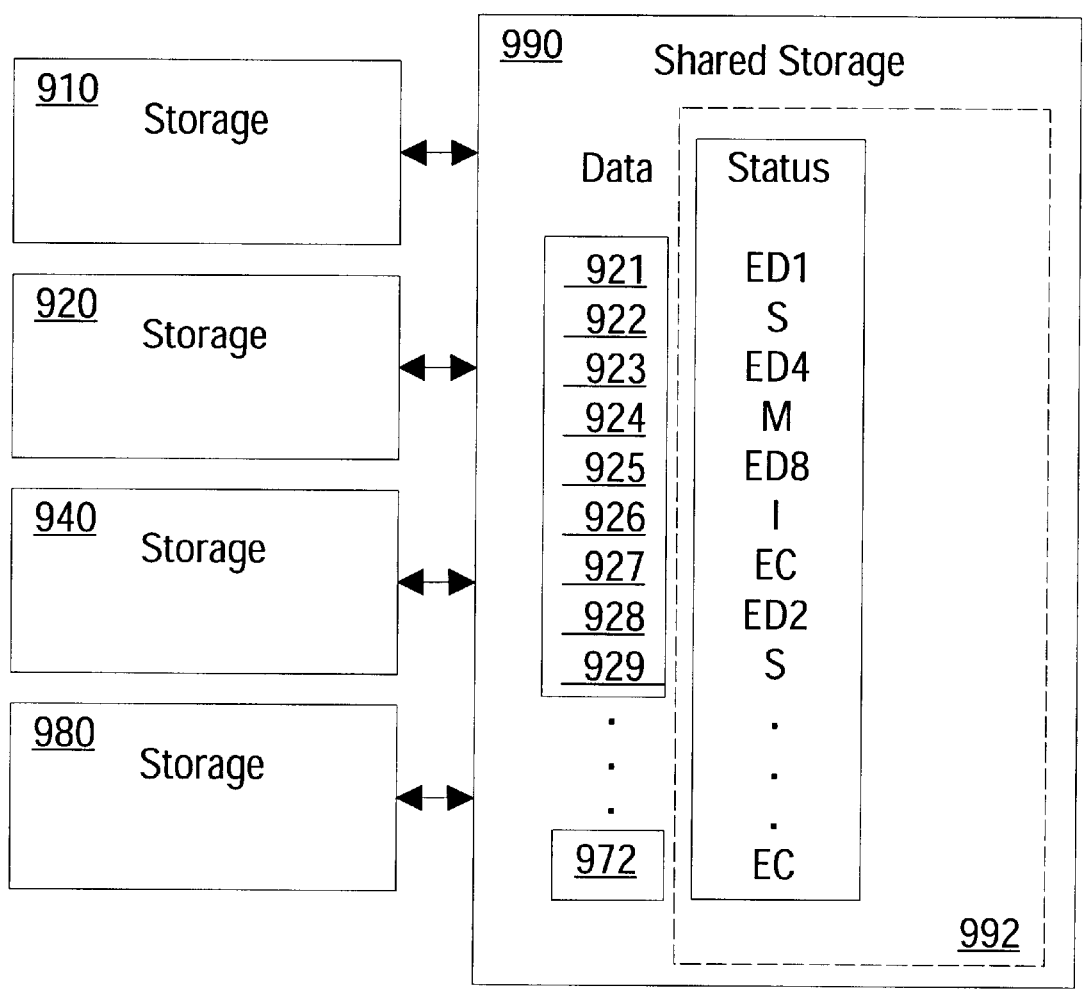

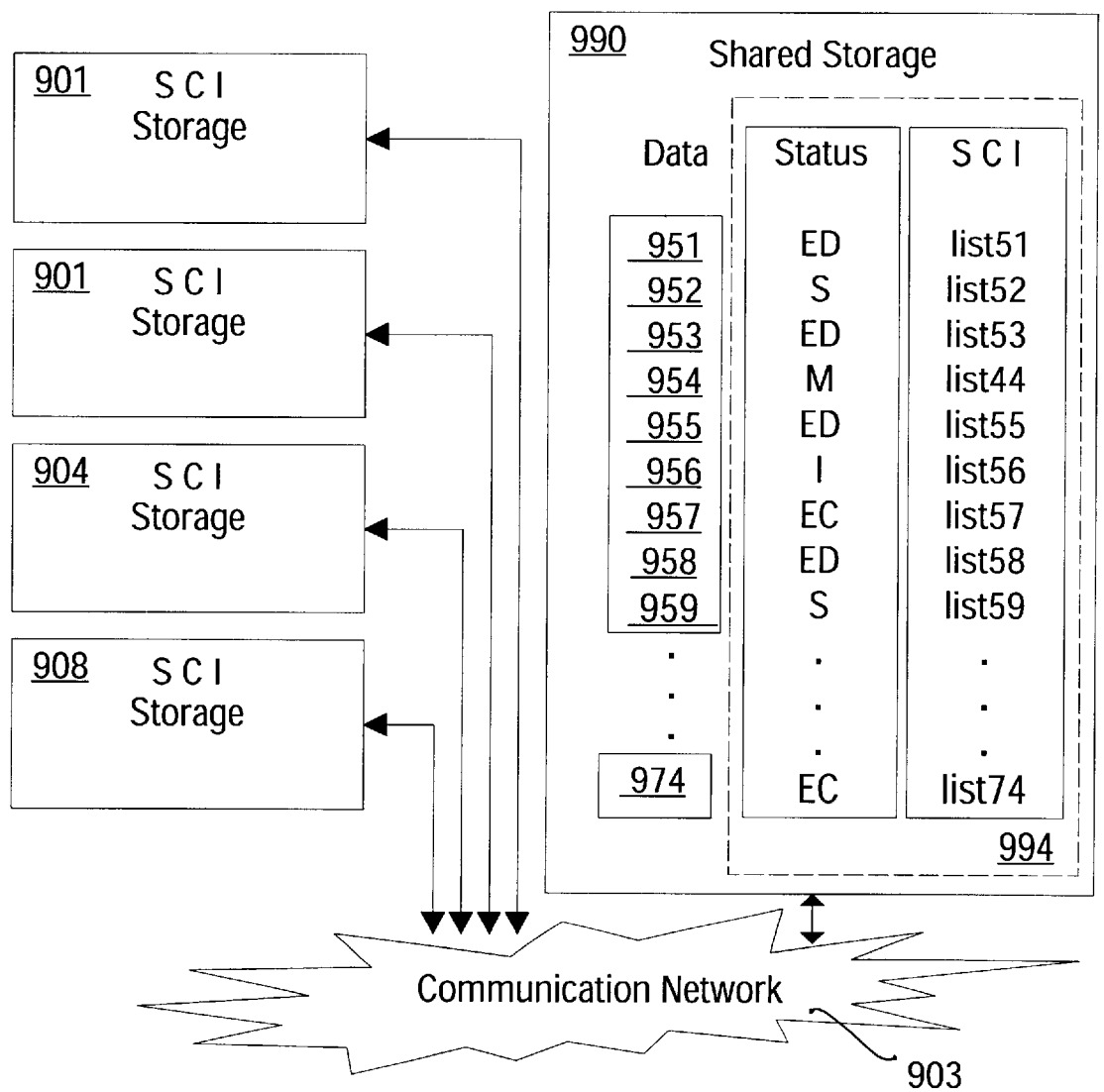

METHOD AND APPARATUS FOR SCALABLE DISAMBIGUATED COHERENCE IN SHARED STORAGE HIERARCHIES

FIELD OF THE INVENTION

This invention relates generally to shared storage hierarchies in multiprocessing systems, and in particular to use of an exclusive dirty status in a coherence protocol to disambiguate ownership and modification status for memory references in a shared multi-level storage hierarchy.

BACKGROUND OF THE INVENTION

In a multiprocessing system with a shared multi-level storage hierarchy, typically comprising a shared cache storage, one processor may request access from a shared cache storage to data that is in a state of ownership by another processor. The requesting processor does not know if the requested data in the shared cache storage is valid or if it has been modified by another processor in a private storage at another level of the storage hierarchy. Therefore the requested data in the shared cache storage is not useful to the requesting processor until its actual status can be determined. An ambiguous status for data in shared cache storage hierarchies is referred to as a "sharing ambiguity."

One method for resolving sharing ambiguities in multiprocessing systems makes use of a common bus to snoop transactions (M. Papamarcos and J. Patel, "A Low-Overhead Coherence Solution for Multiprocessors with Private Cache Memories," Proc. 11th ISCA, 1984 pp. 348–354). Snooping transactions on a common bus to maintain coherence increases traffic to a processor's private cache storage. This increased traffic is not necessarily related to data that is actually needed by the respective processor. Therefore a disadvantage of snooping is that the average latency of cache accesses is increased since requests for data have to compete with snoops for access to the private caches. Moreover, the competition increases with the number of processors sharing a common bus. As a consequence, overall system performance suffers due to slower average access times. A second disadvantage of snooping can occur because an access to requested data in the shared cache storage must wait until results of snooping are received.

Another method for resolving sharing ambiguities involves broadcasts of inquiries (commonly referred to as disambiguating inquiries or backward inquiries) over an interconnection network shared by the processors with access to the shared cache storage. When requested data is found to be in an ambiguous state, an inquiry is broadcast to the other processors. Again, latency increases since the requesting processor must wait until responses to the broadcast inquiry are received. As the number of processors sharing a cache storage increases, so does the potential number of broadcasts and responses—contributing to increased network congestion.

In addition to the increases in latency associated with these prior methods, there are also additional costs associated with providing hardware functionality in order to implement a particular chosen method. Hardware functionality requires additional circuitry, and additional circuitry requires increased silicon area. An undesirable secondary effect of additional hardware circuitry and increased silicon area is an increase in the number and severity of critical timing paths, potentially resulting in further performance degradation for the overall system.

Another method used in distributed systems is known as SCI (Scalable Coherent Interface, IEEE Std 1596–1992 *Scalable Coherent Interface,* Piscataway, N.J.). SCI supports a one-writer-multiple-reader format with a distributed doubly linked list that is maintained through main memory. Addresses of private cache storage are inserted onto the list in a controlled manner and only the address at the head of the list may overwrite the data. The interface maintains a coherent storage hierarchy, by forwarding data requests to the head of the list. One disadvantage of such a system is that before data may be overwritten the list must be sequentially purged. For large distributed systems, delays associated with such a method potentially contribute to performance degradation of the overall system. In addition to the potential for undesirable network congestion inherent in such a distributed system, problematic issues of link maintenance in cases of distributed system failures must also be addressed.

BRIEF DESCRIPTION OF THE DRAWINGS

The present invention is illustrated by way of example and not limitation in the figures of the accompanying drawings.

FIG. 9b illustrates another alternative embodiment of a coherent storage hierarchy including private storage and shared storage that supports resolving sharing ambiguities.

FIG. 9d illustrates another alternative embodiment of a coherent storage hierarchy in a networked distributed system including private storage and shared storage that supports resolving sharing ambiguities.

DETAILED DESCRIPTION

For one embodiment of a coherent shared storage hierarchy in a multiprocessor system, a shared data storage unit provides storage portions to hold data, which may be called data portions, and storage portions to hold corresponding status encodings, which may be called status portions. The shared storage unit may be, for example, a shared cache or a shared file storage or a shared data base or some other shared storage, and the data portions may be cache lines or files or records or some other portion of data respectively. As it is common to refer to a cache line and the data stored in a cache line synonymously, or to refer to a file and the data stored in a file synonymously; a data portion and the data stored in a data portion may be used interchangeably if, for example, no distinction is being made between the two.

A status encoding corresponding to a particular data portion provides enough information to disambiguate a data request to shared storage without resorting to prior methods of snooping a shared bus or of transmitting backward status inquiries to private storage.

Shared-storage control transmits the data from shared storage in response to the data request if its corresponding status encoding indicates a clean status, meaning that no private copies of the requested data have been modified. On the other hand, shared-storage control transmits a data request to a private storage unit if the corresponding status encoding indicates an exclusive dirty status, meaning that a copy of the requested data in private storage has been modified. The private storage unit, in turn, provides a coherent copy of the requested data to the shared storage unit. Shared-storage control then proceeds to satisfy the initial data request with the coherent copy provided by the private storage unit. Alternatively, the coherent copy could be provided directly by the private storage unit to the shared storage unit and to satisfy the initial data request simultaneously or in either order.

If a data request to the shared storage unit indicates a need to modify the requested data, shared-storage control also provides for invalidation transmissions to private storage units that have previously requested copies of the relevant data. The status encoding corresponding to a portion comprising such data is then set to an exclusive dirty status to provide means for coherently processing potential future data requests.

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims.

Figure 1:
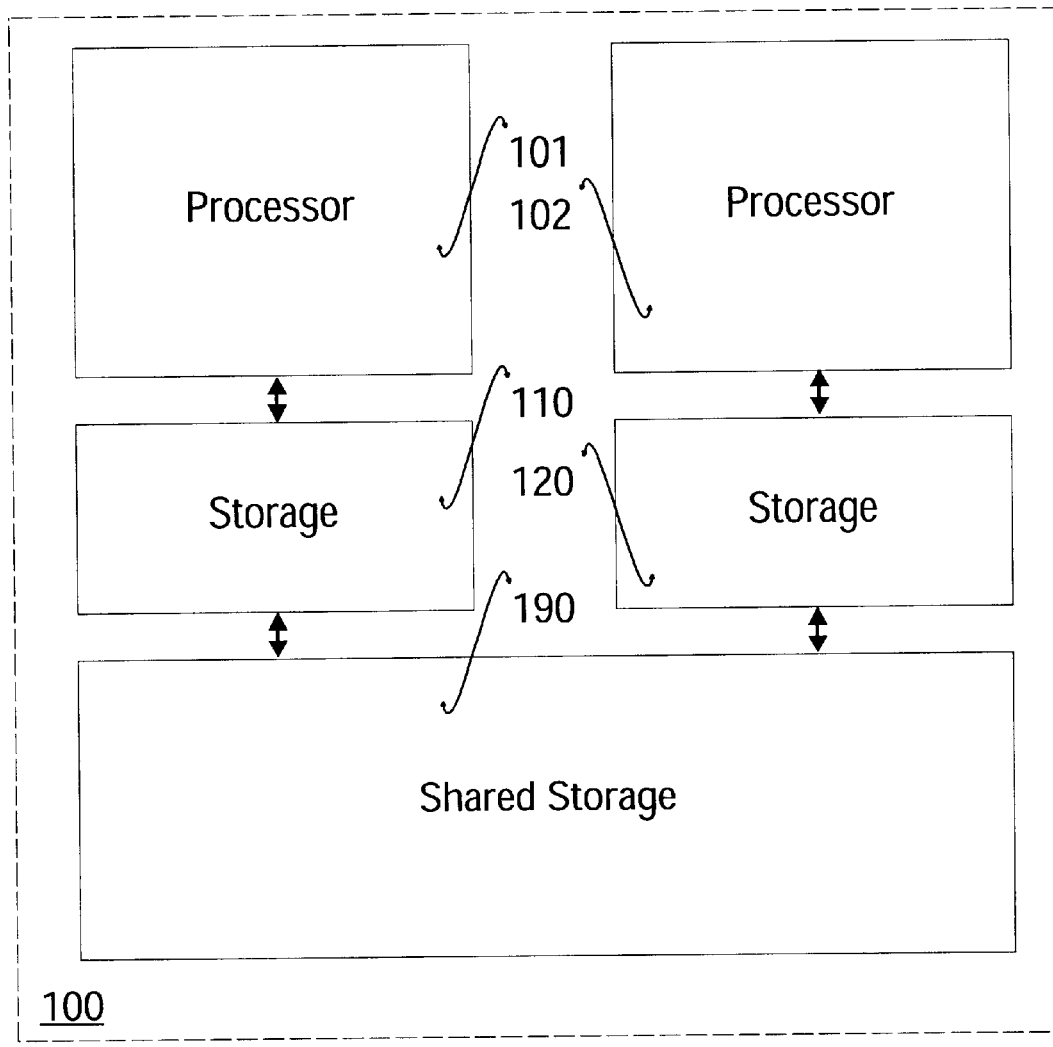
FIG. 1 shows a multiprocessing system with shared and private storage.

FIG. 1 shows a multiprocessing system 100 with shared storage 190, which provides data to private storage 110 for processor 101 and to private storage 120 for processor 102. Multiprocessing system 100 may be on a single or on multiple printed circuit boards. Alternatively, multiprocessing system 100 may be on a multiple-processor-core silicon die, or in a multi-chip module, or distributed on a communication network.

A coherent storage hierarchy is one in which a processor request to read a portion of data that has previously been modified somewhere in the hierarchy results in an up-to-date copy of the modified data portion being supplied to the requesting processor. Coherence protocols are used to guarantee such behavior in a storage hierarchy. One such coherence protocol uses four states: M (modified), E (exclusive), S (shared) and I(invalid). A detailed description of the MESI protocol may be found in (Lilja, D. J., Cache Coherence in Large-Scale Shared-Memory Multiprocessors: Issues and Comparisons, ACM Computing Surveys, 25(3), September 1993).

As described above, sharing ambiguities in such systems must be disambiguated through some means before a processor request may be satisfied in a coherent manner.

Figure 2:
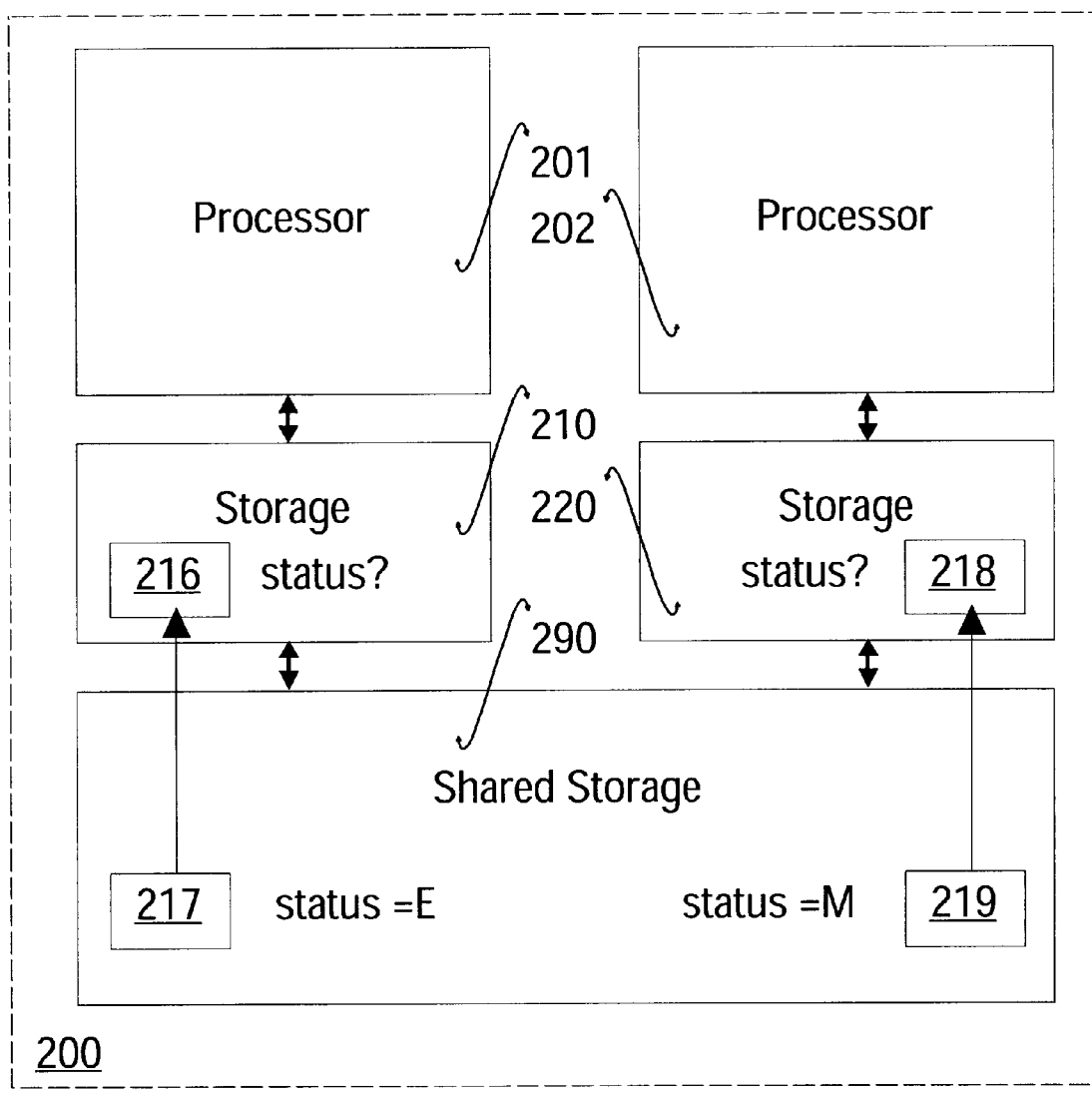
FIG. 2 illustrates an example of sharing ambiguities in a multiprocessing system with shared and private storage.

FIG. 2 illustrates an example of sharing ambiguities in a multiprocessing system 200 with shared storage 290 and private storage 210 and 220. For instance, if data portion 219 has a status of M in shared storage 290 and a processor 202 has previously requested a data portion copy 218, it is ambiguous as to which copy (data portion 219 or data portion 218) should be provided in response to a subsequent data request for data portion 219 from processor 201. If processor 202 has not modified data portion 218 then shared storage 290 may provide a copy of data portion 219 to the private storage 210 for processor 201. This would provide faster access to data portion 219 and contribute to better overall system performance. But if processor 202 has modified data portion 218, then a data request should be sent from shared storage 290, to private storage 220 for an updated copy of data portion 218, with which to satisfy the data request of processor 201. The modified status of data portion 219 is ambiguous. In order for shared storage 290 to respond to the data request, the status of data portion 218 in private storage 220 needs to be known to shared storage 290.

A similar situation exists for data having an exclusive status, E. For instance, if data portion 217 has a status of E in shared storage 290 and processor 201 has previously requested a data portion copy 216, it is ambiguous as to which copy (data portion 217 or data portion 216) should be provided in response to a subsequent data request for data portion 217 from processor 202. If processor 201 has not modified data portion 216 then shared storage 290 may provide a copy of data portion 217 to the private storage 220 for processor 202. Again, this would provide faster access to data portion 217 and contribute to better overall system performance. But if processor 201 has modified data portion 216, then a data request should be sent from shared storage 290, to private storage 210 for an updated copy of data portion 216, with which to satisfy the data request of processor 202. The exclusive status of data portion 217 is ambiguous. In order for shared storage 290 to respond to the data request, the status of data portion 216 in private storage 220 needs to be known to shared storage 290.

It will be appreciated that the M status and the E status are both exclusive statuses when a processor has a right to modify the data, since both indicate sole ownership. The difference is that the M status indicates a need to update the central storage or main memory. In order to resolve sharing ambiguities and avoid backward inquiries the status of a data portion is tracked in the shared storage. What is needed is a way to indicate that these exclusive statuses require data updates from peripheral private storage.

Figure 3:
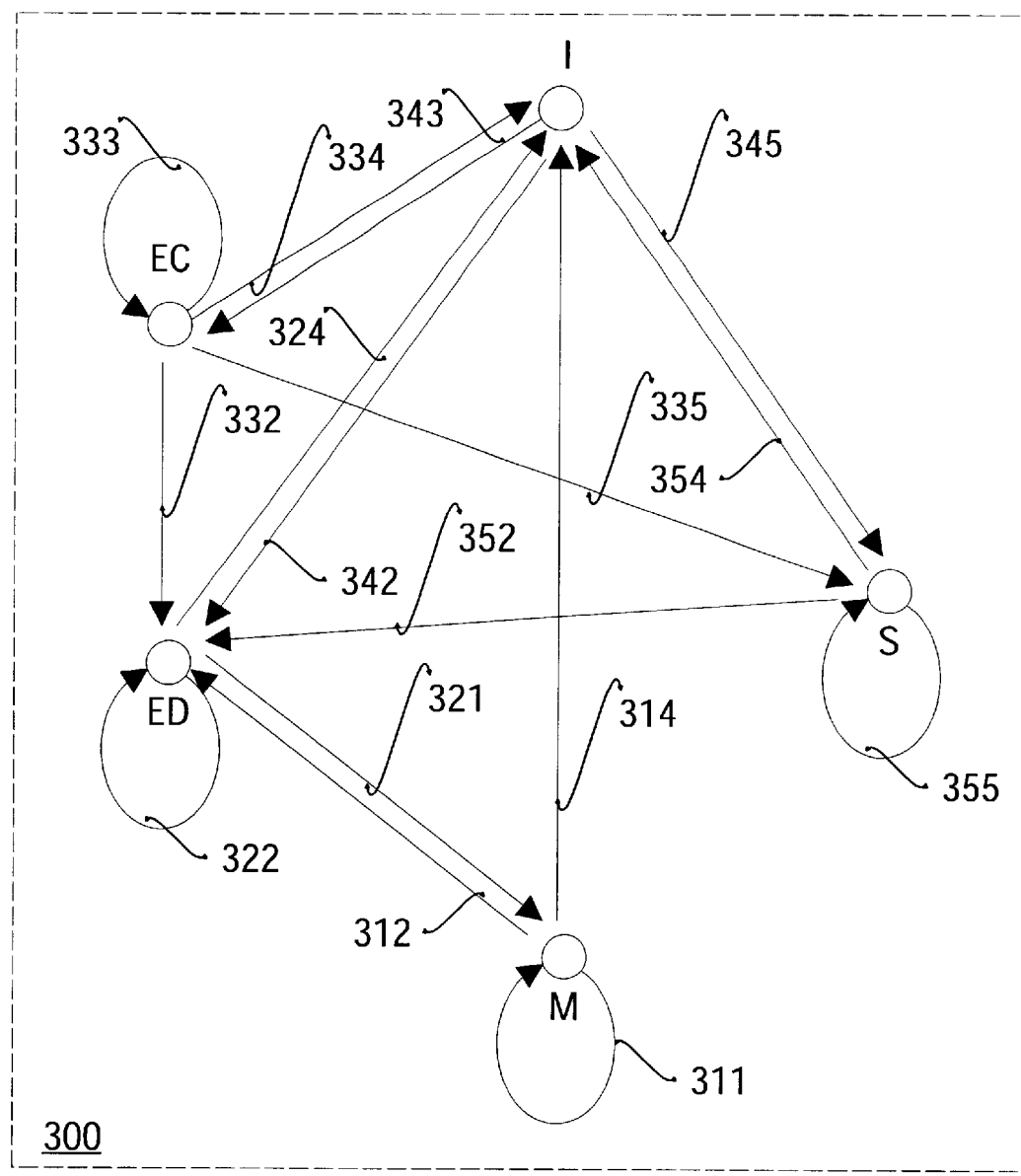
FIG. 3 shows a state transition diagram for one embodiment of a coherency protocol for resolving sharing ambiguities, the protocol including an exclusive-dirty status and an exclusive-clean status.

FIG. 3 shows a state transition diagram 300 for one embodiment of a coherency protocol for resolving sharing ambiguities, the protocol including an exclusive-dirty status (ED) and an exclusive-clean status (EC). Prior to a data request a data portion may be given a default status of I, or in response to an invalidation request a data portion may be returned to a status of I by transition 314 from a status of M, transition 324 from a status of ED, transition 334 from a status of EC, or transition 354 from a status of S. Following a data request to a central storage or a main memory, a data portion may be supplied to shared storage having a status of EC according to transition 343, or having a status of S according to transition 345. If the data request is to modify the data portion a status of ED may be assigned according to transition 342.

Following a data request from a private storage, a data portion having an initial status of EC may retain a status of EC according to transition 333 if no data portion copies reside in a private storage other than the requesting private storage. It may be assigned a new status of S according to transition 335 if a data portion copy resides in a private storage other than the requesting private storage, or it may be assigned a new status of ED if the data request from private storage is a request for ownership with a right to modify the data portion. A data portion having an initial status of S may be reassigned a status of S according to transition 355 if the data request from private storage is not a request for ownership with a right to modify the data portion, or it may be assigned a new status of ED according to transition 352 if the data request is a request for ownership with a right to modify. It will be appreciated that a transmission of invalidation requests to private storage may also be associated with transition 352.

If a data portion is written back to shared storage from private storage, an initial status of ED may be assigned a new status of M according to transition 321, and conversely a data portion having an initial status of M may be assigned a new status of ED following a data request for ownership with a right to modify the data portion. A data portion having an initial status of ED may retain or return to a status of ED according to transition 322 following a data request for ownership with a right to modify the data portion. It will be appreciated that other associated activities, such as requesting a updated copy of the data portion, and transmitting invalidation requests may accompany transition 322 and that interim temporary status assignments may be used in conjunction with these associated activities. Finally, a data portion having an initial status of M may retain a status of M according to transition 311 following a data request that is not a request for ownership with a right to modify the data portion until the data portion has been written back to central storage or main memory.

It will be appreciated that a set of five statuses may be encoded using three or more bits. It will also be appreciated that a set of dirty status encodings could also include a modified-dirty (MD) status encoding to indicate a need to receive a data update from a peripheral private storage having ownership with a right to modify, and that a set of statuses including a sixth status could conveniently be encoded without requiring additional encoding bits. It will further be appreciated that some implementations may find it beneficial to also include a sixth status.

For one embodiment of a coherence protocol for disambiguated coherence in shared storage hierarchies, a method is herein disclosed that provides for indicating one or more exclusive dirty statuses for a data portion in a shared storage to track ownership in a private storage thereby disambiguating the shared status, reducing backward inquiries and improving overall system performance.

Figure 4:
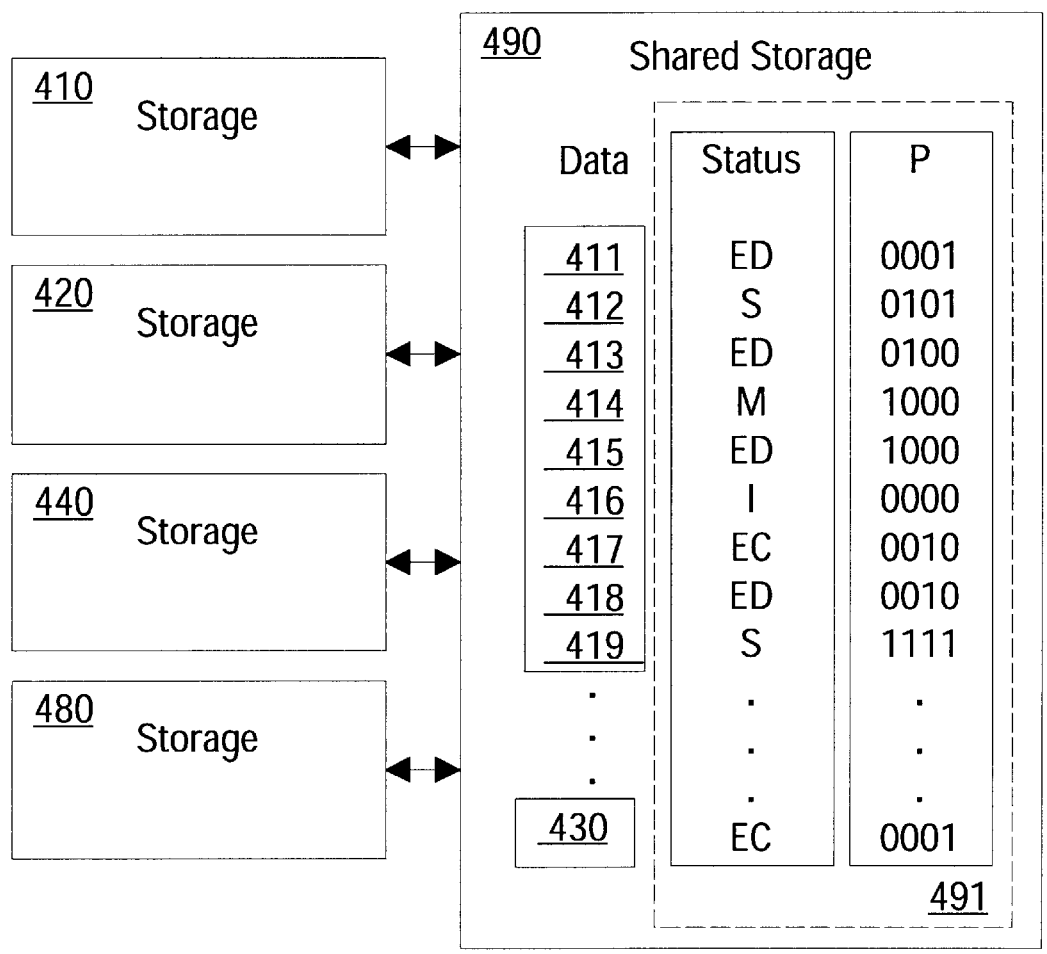
FIG. 4 illustrates one embodiment of a coherent storage hierarchy including private storage and shared storage that supports resolving sharing ambiguities without backward inquiries.

It will be appreciated that a further reduction in backward inquiries may be garnished if the identity of a private storage owner of a data portion having an exclusive dirty status was also known to the shared storage. For one embodiment of a coherent storage hierarchy, FIG. 4 illustrates a scalable presence encoding to be held in a presence portion of storage for a corresponding data portion that further reduces backward inquiries and potentially avoids unnecessary invalidation requests.

Shared storage 490 stores data portions 411 through 430. Each data portion has, in storage control 491, a corresponding status portion to hold a status encoding and a corresponding presence portion to hold a presence encoding. When a data request is received from private storage 410, private storage 420, private storage 440, or private storage 480, a copy of the requested data portion is retrieved from a central storage or main memory and stored by shared storage 490. A corresponding status portion holds a status encoding of the data portion. A corresponding presence portion holds a presence encoding according to which private storage units have requested a copy of the data portion.

For example a status portion corresponding to data portion 411 holds a status encoding of ED and a corresponding presence portion holds a presence encoding of 0001 indicating that data portion 411 has been provided to private storage 410 in response to a data request of a type that indicates a need to modify the requested data portion. Similarly data portion 413 has a status encoding of ED and a presence encoding of 0100 indicating that data portion 413 has been provided to private storage 440 in response to a data request with a need to modify the data. Data portion 415 has a status encoding of ED and a presence encoding of 1000 indicating that data portion 415 has been provided to private storage 480 in response to a data request with a need to modify the requested data. And finally, data portion 418 has a status encoding of ED and a presence encoding of 0010 indicating that data portion 418 has been provided to private storage 420 in response to a data request of a type that indicates a need to modify the requested data portion.

A status portion corresponding to data portion 412 holds a status encoding of S and a corresponding presence portion holds a presence encoding of 0101 indicating that data portion 412 has been provided to private storage 410 and to private storage 440 in response to data requests of a type that does not indicate a need to modify the requested data portion. Similarly data portion 419 has a status encoding of S and a presence encoding of 1111 indicating that data portion 419 has been provided to private storage 410, private storage 420, private storage 440 and private storage 480 in response to data requests of a type that does not indicate a need to modify the requested data portion.

Data portion 414 has a status encoding of M and the corresponding presence portion holds a presence encoding of 1000 indicating that the previously modified data portion 414 has been provided to private storage 480 in response to a data request that does not indicate a need to modify the data.

Data portion 416 has a status encoding of I and a presence encoding of 0000 indicating that data portion 416 is invalid in shared storage, in which case the data or any information about private storage which could have previously held a copy may or may not be accurate. If a notion of inclusion is enforced, then any private storage having a copy would have also invalidated it. Alternatively, the storage location could correspond to a data portion that was evicted from shared storage and subsequently the same storage location was invalidated, in which case a copy of the data portion may reside in private storage.

Data portion 417 has a status encoding of EC and a presence encoding of 0010 indicating that data portion 417 has been provided exclusively to private storage 420 in response to a data request of a type that does not indicate a need to modify the requested data. Finally, data portion 430 has a status encoding of EC and a presence encoding of 0001 indicating that data portion 430 has been provided exclusively to private storage 410 in response to a data request that does not indicate a need to modify the requested data. It will be appreciated that copies of a data portion having a status encoding of EC may also be provided to multiple private storage units within the local storage hierarchy rooted at a particular shared storage.

The coherent storage hierarchy of FIG. 4 provides for resolving sharing ambiguities without requiring a shared bus for snooping. It further provides for reducing backward inquiries and for reducing transmission of unnecessary invalidation requests, thereby contributing toward higher system performance.

Figure 5:
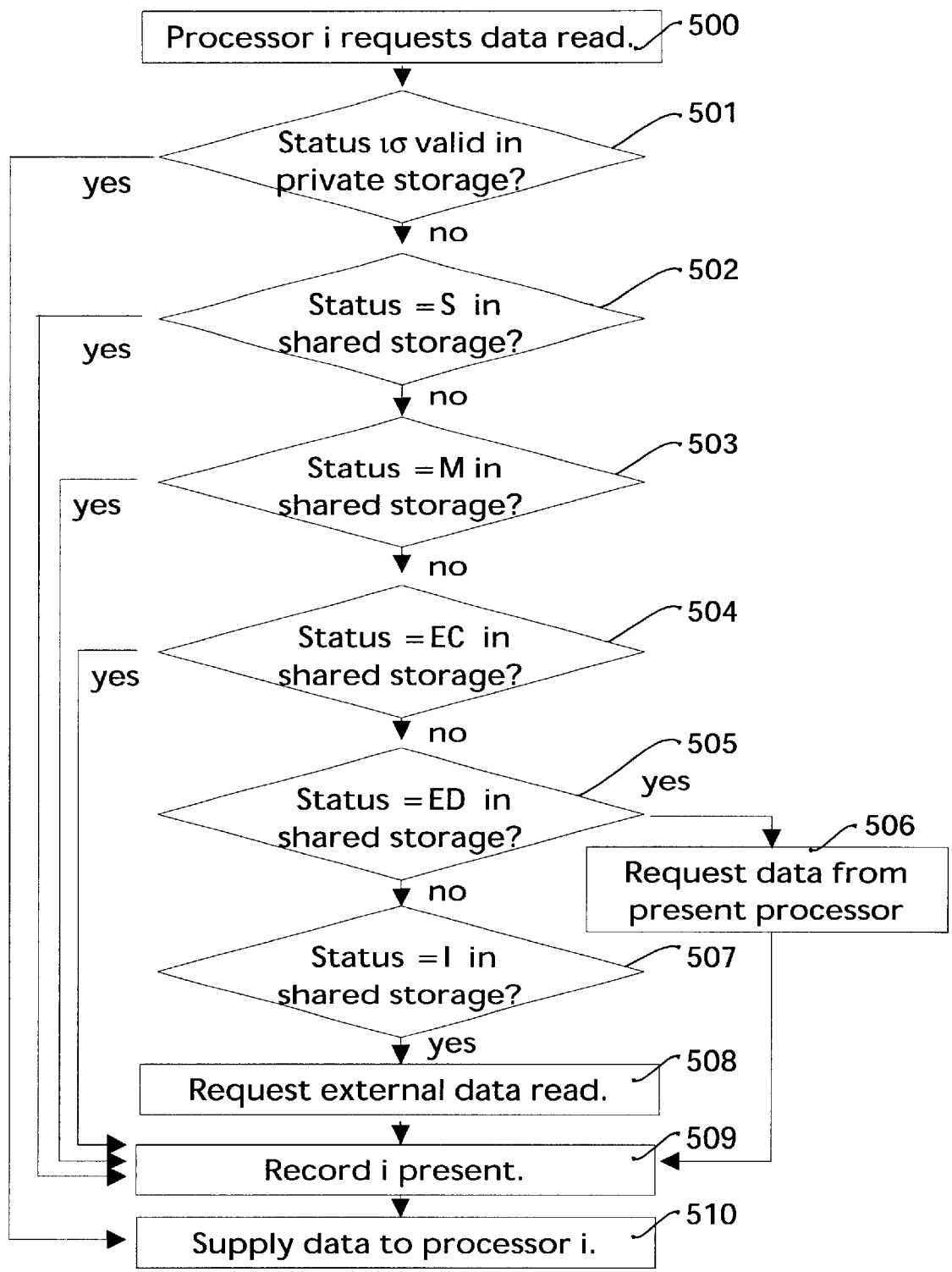
FIG. 5 illustrates one embodiment of a method for resolving sharing ambiguities in accordance with the coherent storage hierarchy of FIG. 4.

FIG. 5 illustrates one embodiment of a method for resolving sharing ambiguities in accordance with the coherent storage hierarchy of FIG. 4. In processing block 500, processor i requests to read a data portion, the data request being received by processor i's private storage and processed by processing block 501. In processing block 501, if the data portion is valid in private storage, then control flow proceeds to processing block 510, which provides the requested data portion to processor i. Otherwise, the data request is received by storage control 491 and processed by processing block 502. In processing block 502, if the status of the requested data portion is S, then control flow proceeds to processing block 509, which assigns a presence encoding to the data portion to indicate that a shared copy of the data portion will reside in the private storage of processor i. Otherwise, control flow proceeds to processing block 503. In processing block 503, if the status of the requested data portion is M, then control flow proceeds to processing block 509, which assigns a presence encoding to the data portion to indicate that a copy of the modified data portion will reside in the private storage of processor i. Otherwise, control flow proceeds to processing block 504. In processing block 504, if the status of the requested data portion is EC, then control flow proceeds to processing block 509, which assigns a presence encoding to the data portion to indicate that an exclusive copy of the data portion will reside in the private storage of processor i. Whenever control flow proceeds to processing block 509, the data portion in shared storage is an up-to-date copy and may be provided by shared storage in response to a data request.

If the status of the data portion is not EC then control flow proceeds to processing block 505. In processing block 505, if the status of the requested data portion is ED, then control flow proceeds to processing block 506, which requests an updated data portion from a private storage indicated by the corresponding presence encoding. Following the receipt of an updated copy, a new status encoding, of M for instance, may be reassigned to the data portion. Alternatively the data portion may be written back to central storage or main memory and a new status of EC or S may be reassigned to the data portion. Control flow then proceeds to processing block 509, which assigns a presence encoding to the data portion to indicate that a copy of the data portion will reside in the private storage of processor i. Depending on the type of data request being processed, processing block 509 may also transmit invalidation requests to private storage previously indicated by the corresponding presence encoding. When processing has completed in processing block 509, control flow proceeds to processing block 510, which completes the transaction by supplying the requested data portion to the private storage of processor i.

If the status of the requested data portion is not ED in processing block 505, then control flow proceeds instead to processing block 507. In processing block 507, if the status of the requested data portion is I, then control flow proceeds to processing block 508, which requests an external data portion from central storage or main memory. Following the receipt of the requested data portion from central storage or main memory, control flow proceeds to processing block 509, which assigns a presence encoding to the data portion to indicate that a copy of the data portion will reside in the private storage of processor i. Control flow then proceeds to processing block 510, which supplies the requested data portion to the private storage of processor i.

It will be appreciated that the embodiment of FIG. 5 is illustrated by way of example and not limitation and that the disclosed embodiment may be modified in arrangement and detail by those skilled in the art. For instance, additional processing blocks may be included or combined to transmit invalidation requests, or to reassign new status encodings in accordance with a state transition diagram like the one shown in FIG. 3. Additionally, the order with which control flow proceeds from processing block to processing block may be modified without departing from the principles of the disclosed embodiment within the scope of the accompanying claims. The methods and apparatus disclosed above may be employed in a multiprocessing system to provide a coherent storage hierarchy with reduced backward inquiries and reduced unnecessary invalidation requests.

Figure 6:
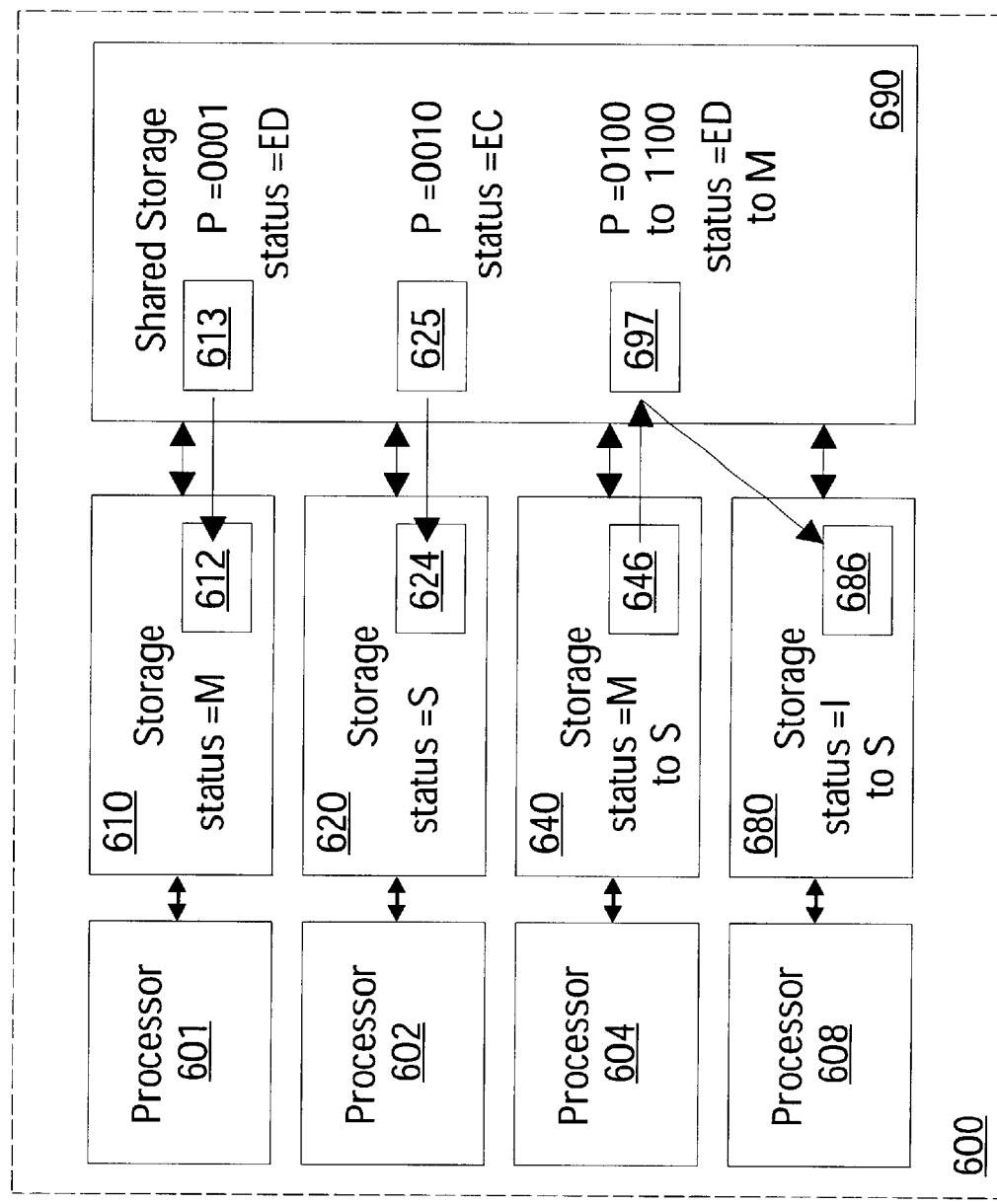
FIG. 6 illustrates an example of a multiprocessing system using the coherent storage hierarchy of FIG. 4.

FIG. 6 illustrates an example of a multiprocessing system 600 using the coherent storage hierarchy of FIG. 4, including processor 601 and its private storage 610, processor 602 and its private storage 620, processor 604 and its private storage 640, processor 608 and its private storage 680, and shared storage 690. Data portion 613, for example, has a status encoding of ED and a presence encoding of 0001 indicating that a modified data portion copy 612 resides in private storage 610 of processor 601. Data portion 625, for example, has a status encoding of EC and a presence encoding of 0010 indicating that an unmodified data portion copy 624 resides in private storage 620 of processor 602. If, for example, processor 608 requests a copy 686 of data portion 697 and copy 686 has a corresponding status of I then a request for data portion 697 is transmitted to shared storage 690. If the status of data portion 697 is ED and the corresponding presence encoding is 0100 indicating that a modified copy 646 resides in private storage 640, then a data request is transmitted to private storage 640 for the modified copy 646. Private storage 640 may transmit the requested copy 646 and reassign it a status encoding of S. When the modified copy 646 is received by shared storage 690, data portion 697 may be updated and reassigned a status encoding of M. Updated data portion 697 may then be provided to private storage 680 and reassigned a presence encoding of 1100 to indicate that the two copies reside in private storage 640 and private storage 680. When data portion 697 is received by private storage 680, copy 686 may be updated and reassigned a status encoding of S. Thus the shared status of data portion 697 is disambiguated without snooping or unnecessary backward inquiries.

Figure 7:
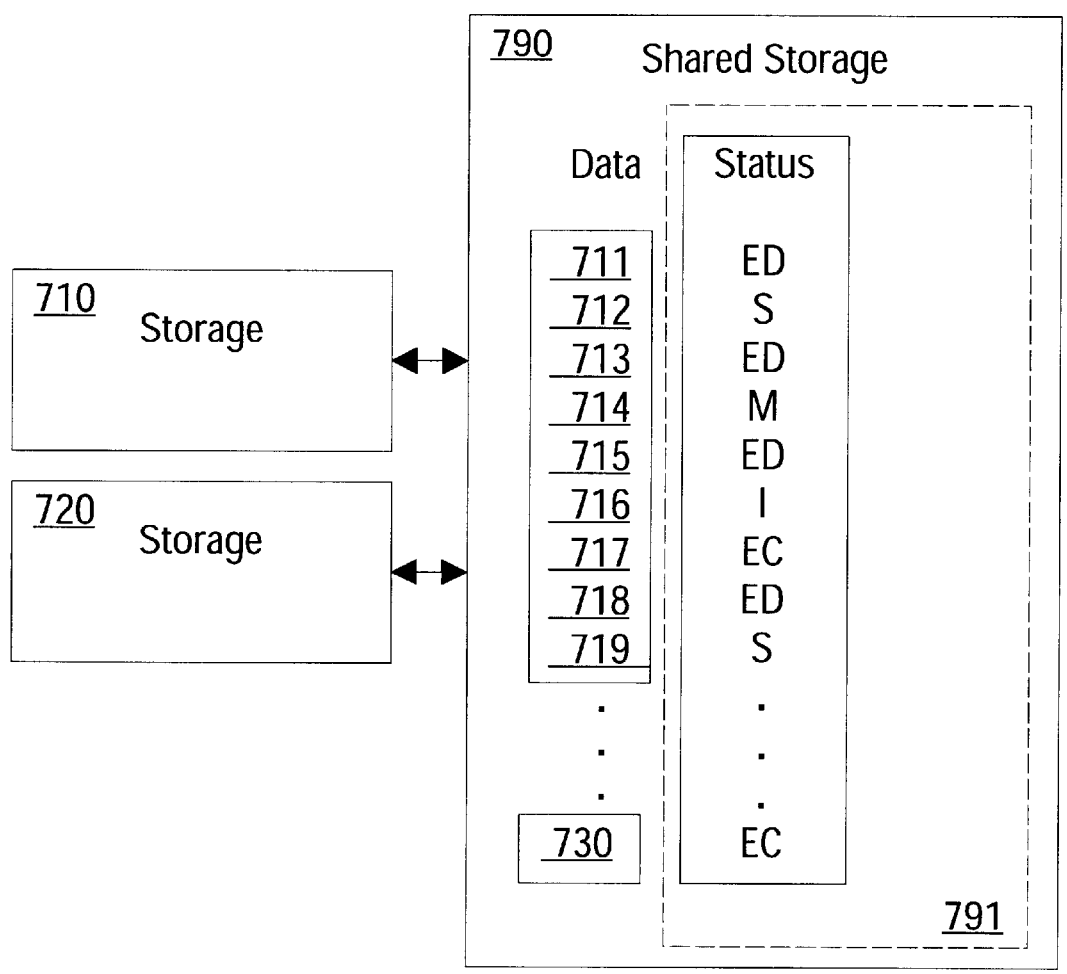
FIG. 7 illustrates another embodiment of a coherent storage hierarchy including private storage and shared storage that supports resolving sharing ambiguities.

FIG. 7 illustrates another embodiment of a coherent storage hierarchy that supports resolving sharing ambiguities. It will be appreciated that since shared storage 790 provides data portions to only two private storage units, private storage 710 and private storage 720, it is possible to disambiguate a data request without resorting to a presence encoding for each data portion being explicitly stored in control 791. If a particular private storage unit requests a data portion from shared storage, then an exclusive-dirty status encoding corresponding to that data portion indicates that the other private storage unit contains a modified copy of the requested data portion.

For example status portions corresponding to data portion 711, data portion 713, data portion 715 and data portion 718 hold status encodings of ED, so if the corresponding data portions are requested by one of the private storage units, then they would have already been provided to the other private storage unit in response to a data request of a type that indicates a need to modify the requested data portion. Data portion 712 and data portion 719 have status encodings of S indicating that the corresponding data portion has been provided to one of the private storage units in response to a data request that does not need to modify the requested data portion. Data portion 714 has a status of M indicating that the previously modified data portion 714 may be provided in response to a data request that does not need to modify the requested data portion. Data portion 716 has a status of I indicating that data portion 716 has been invalidated in shared storage and any private storage which may have previously held a copy. Data portion 717 and data portion 730 have status encodings of EC indicating that the corresponding data portion has been provided in response to a data request of a type that does not need to modify the requested data portion.

Figure 8:
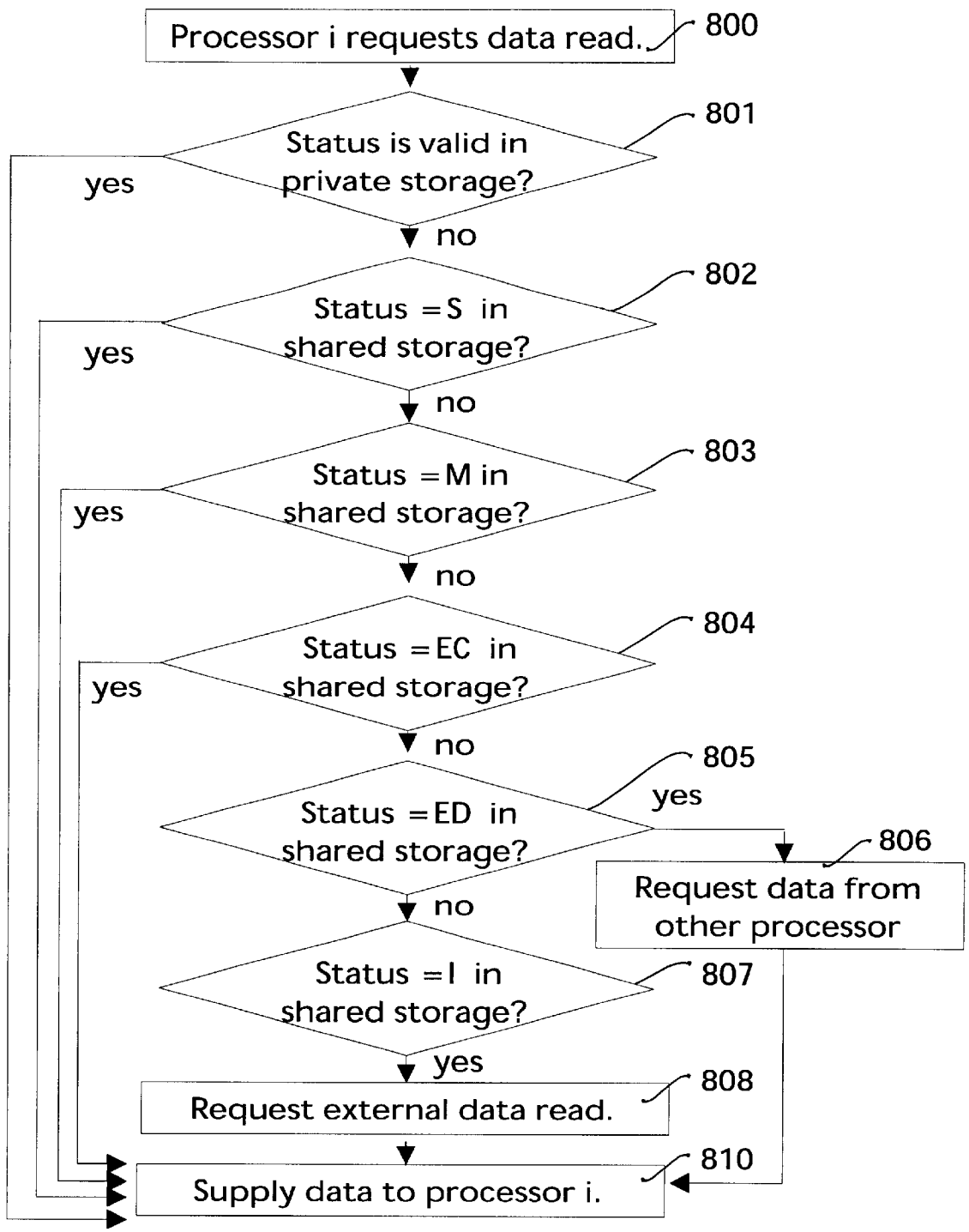
FIG. 8 illustrates one embodiment of a method for resolving sharing ambiguities in accordance with the coherent storage hierarchy of FIG. 7.

FIG. 8 illustrates one embodiment of a method for resolving sharing ambiguities in accordance with the coherent storage hierarchy of FIG. 7. In processing block 800, processor i requests to read a data portion, the data request being received by the private storage of processor i and processed by processing block 801. In processing block 801, if the data portion is valid in private storage, then control flow proceeds to processing block 810, which provides the requested data portion to processor i. Otherwise, the data request is received by storage control 791 and processed by processing block 802. In processing block 802, if the data portion has a status of S, then control flow proceeds to processing block 810, which completes the transaction by supplying the requested data portion to the private storage of processor i. Otherwise, control flow proceeds to processing block 803. In processing block 803, if the requested data portion has a status of M, then control flow proceeds to processing block 810, which completes the transaction by supplying the requested data portion to the private storage of processor i. Otherwise, control flow proceeds to processing block 804. In processing block 804, if the requested data portion has a status of EC, then control flow proceeds to processing block 810, which supplies the requested data portion to the private storage of processor i. Otherwise, control flow proceeds to processing block 805.

In processing block 805, if the requested data portion has a status of ED, then control flow proceeds to processing block 806, which requests an updated data portion from the private storage of the processor that did not initiate the data request. Following the receipt of an updated copy, a new status encoding, of M for instance, may be reassigned to the data portion. Alternatively the data portion may be written back to central storage or main memory and a new status of EC or S may be reassigned to the data portion. Control flow then proceeds to processing block 810, which supplies the requested data portion to the private storage of processor i.

If the data portion does not have a status of ED in processing block 805, then control flow proceeds instead to processing block 807. In processing block 807, if the data portion has a status encoding of I, then control flow proceeds to processing block 808, which requests an external data portion from central storage or main memory. Following the receipt of the data portion from central storage or main memory, control flow proceeds to processing block 810, which completes the transaction by supplying the requested data portion to the private storage of processor i.

It will be appreciated that tradeoffs and modifications may be made by those skilled in the art without departing from the principles of the present invention within the scope of the accompanying claims. For instance, a tradeoff may be made between the amount of information encoded by a presence encoding and the average number of unnecessary invalidation requests transmitted. A similar tradeoff may be made between the presence encodings and the average number of backward data requests transmitted to private storage.

Figure 9A:
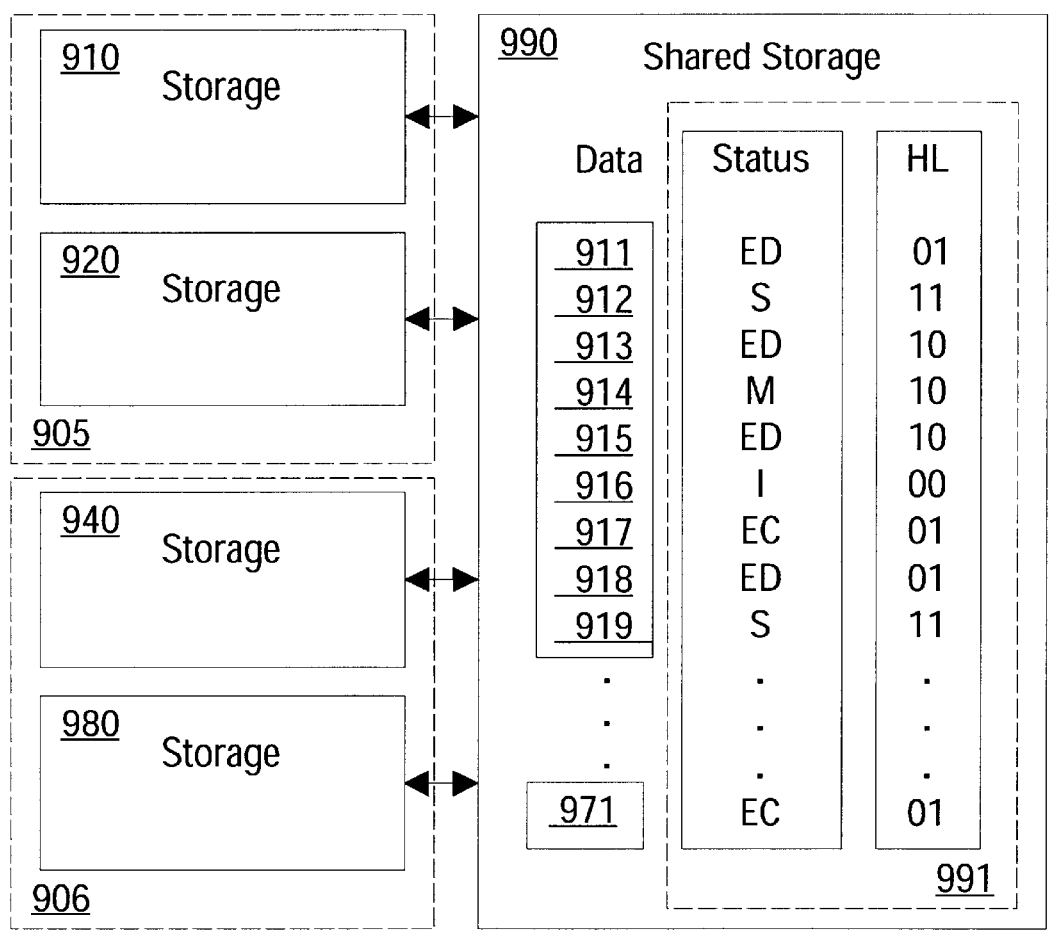
FIG. 9a illustrates an alternative embodiment of a coherent storage hierarchy including private storage and shared storage that supports resolving sharing ambiguities.

FIG. 9a illustrates an alternative embodiment of a coherent storage hierarchy including private storage 910, private storage 920, private storage 940, private storage 980, and shared storage 990 that supports resolving sharing ambiguities. Control 991 includes a status portion and a presence portion for each corresponding data portion stored by shared storage 990. The presence portion of control 991 holds a presence encoding, which indicates either the two high-order private storage units 906 or the two low-order private storage units 905. If an invalidation request must be transmitted, control 991 transmits requests to both of the low-order private storage units 905 when the least significant bit of a presence encoding is set and to both of the high-order private storage units 906 when the most significant bit of a presence encoding is set. Thus half as much storage is needed to store presence encodings and potentially twice as many invalidation requests are transmitted. Potentially five thirds the average number of backward data requests are also transmitted to provide coherence when a requested data portion has a status of ED.

For example, data portion 911, data portion 913, data portion 915 and data portion 918 have statuses of ED; so if one of these data portions is requested by a private storage unit identified with the same presence encoding, then the data portion has already been provided to the other private storage unit identified with that presence encoding in response to a data request of a type that indicates a need to modify the requested data portion. On the other hand, if the requesting private storage unit is not indicated by the presence encoding, then a data request for an updated copy will be transmitted to both of the private storage units indicated by the presence encoding. Since ED is an exclusive status, only one will respond.

Status portions corresponding to data portion 912 and data portion 919 hold status encodings of S and their corresponding presence portions hold presence encodings of 11 indicating that these data portions have been provided to at least two of the private storage units in response to data requests that did not need to modify the requested data portion. If invalidation requests need to be transmitted for either of these data portions, then all four of the private storage units will receive a transmission when, it is possible that only two or three of the private storage units actually need to invalidate their data portions.

Data portion 914 has a status encoding of M and a presence encoding of 10 indicating that the previously modified data portion 914 has been provided to at least one of the high-order private storage units 906 in response to a data request of a type that does not indicate a need to modify the requested data portion. Data portion 916 has a status encoding of I and a presence encoding of 00 indicating that data portion 916 has been invalidated in shared storage and any private storage which may have previously held a copy.

Data portion 917 and data portion 971 have status encodings of EC and presence encodings of 01 indicating that the corresponding data portions have been provided to at least one of the low-order private storage units 905 in response to a data request of a type that does not indicate a need to modify the requested data portion.

Further tradeoffs and modifications may be made in alternative embodiments by one skilled in the art. For instance, it will be appreciated that the amount of information encoded by a three-bit status encoding permits up to four exclusive-dirty statuses to be encoded. For a four-processor system, each exclusive-dirty status encoding could identify the private storage unit holding the most up-to-date copy of a data portion.

FIG. 9b illustrates another alternative embodiment of a coherent storage hierarchy including private storage 910, private storage 920, private storage 940, private storage 980, and shared storage 990. Control 992 includes a status portion for each corresponding data portion stored by shared storage 990. The status portion of control 992 holds a status encoding, which indicates an exclusive-dirty status for each private storage unit, ED1 for private storage 910, ED2 for private storage 920, ED4 for private storage 940, and ED8 for private storage 980. If an invalidation request must be transmitted, control 992 transmits requests to all four of the private storage units. Thus, no unnecessary backward data requests are transmitted when a requested data portion has an exclusive-dirty status. No additional storage is needed to store presence encodings but potentially four times as many invalidation requests are transmitted.

For example, a status portion corresponding to data portion 921 holds a status encoding of ED1 indicating that the corresponding data portion has been provided to the private storage 910 in response to a data request of a type that indicates a need to modify the requested data portion. Data portion 923 has a status encoding of ED4 indicating that the corresponding data portion has been provided to the private storage 940 in response to a data request that indicates a need to modify the requested data portion. Data portion 925 has a status of ED8 indicating that the corresponding data portion has been provided to the private storage 980 in response to a data request that indicates a need to modify the requested data portion. Additionally, data portion 928 has a status of ED2 indicating that the corresponding data portion has been provided to the private storage 920 in response to a data request of a type that indicates a need to modify the requested data portion.

Data portion 922 and data portion 929 have status encodings of S indicating that the corresponding data portion has been provided to one or more of the private storage units in response to a data request that does not need to modify the requested data portion. If invalidation requests need to be transmitted for either of the corresponding data portions, then all four of the private storage units will receive a transmission when, in fact, it is possible that only one, two or three of the private storage units actually need to invalidate the requested data portion.

Data portion 924 has a status of M indicating that the previously modified data portion 924 may be provided to a private storage unit in response to a data request that does not indicate a need to modify the requested data portion. Data portion 926 has a status encoding of I indicating that data portion 926 has been invalidated in shared storage and any private storage which may have previously held a copy. Data portion 927 and data portion 972 have status encodings of EC indicating that the these data portion have each been provided to a private storage unit in response to a data request that did not indicate a need to modify the requested data portion.

Figure 9C:
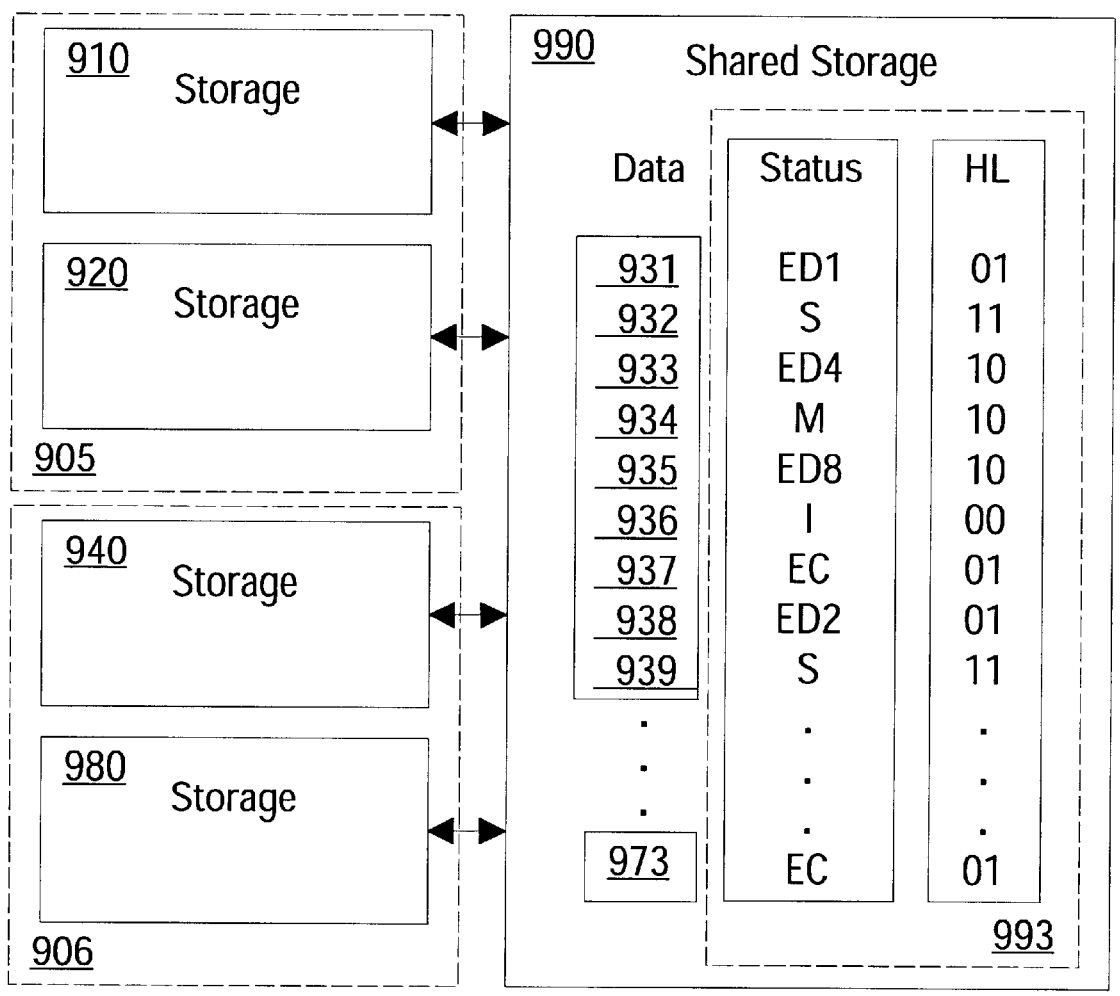
FIG. 9c illustrates another alternative embodiment of a coherent storage hierarchy including private storage and shared storage that supports resolving sharing ambiguities.

FIG. 9c illustrates another alternative embodiment of a coherent storage hierarchy. Control 993 includes a status portion and a presence portion for each corresponding data portion stored by shared storage 990. The status portion of control 993 holds a status encoding, which includes an exclusive-dirty status for each private storage unit, ED1 for private storage 910, ED2 for private storage 920, ED4 for private storage 940, and ED8 for private storage 980. The presence portion of control 993 holds a presence encoding, which includes a high-order bit for high-order storage units 906 including private storage 940 or private storage 980, or a low-order bit for low-order storage units 905 including private storage 910 or private storage 920. If an invalidation request must be transmitted, control 993 transmits requests to two of the private storage units for each presence encoding bit that is set. Thus, no unnecessary backwards data requests are transmitted when a requested data portion has an exclusive-dirty status and half as much additional storage is needed to store presence encodings but potentially twice as many invalidation requests are transmitted.

For example data portion 931 has a status encoding of ED1 and a presence encoding of 01 indicating that data portion 931 has been provided to low-order private storage 910 in response to a data request of a type that indicates a need to modify the requested data portion. Data portion 933 has a status encoding of ED4 and a presence encoding of 10 indicating that data portion 933 has been provided to high-order private storage 940 in response to a data request that indicated a need to modify the requested data portion. Data portion 935 has a status encoding of ED8 and a presence encoding of 10 indicating that data portion 935 has been provided to high-order private storage 980 in response to a data request that indicated a need to modify the requested data portion. Data portion 938 has a status encoding of ED2 and a presence encoding of 01 indicating that data portion 938 has been provided to low-order private storage 920 in response to a data request of a type that indicates a need to modify the requested data portion. If invalidation requests or backwards data requests need to be transmitted for any of these data portions, then only the appropriate private storage unit will receive a transmission.

Data portion 932 and data portion 939 have status encodings of S and presence encodings of 11 indicating that these data portions have been provided to at least two of the private storage units in response to data requests that did not indicate a need to modify the requested data portion. If invalidation requests need to be transmitted for either of these data portions, then all four of the private storage units will receive a transmission when, in fact, it is possible that only two or three of the private storage units may actually need to invalidate their data portions.

Data portion 934 has a status encoding of M and a presence encoding of 10 indicating that the previously modified data portion 934 has been provided to at least one high-order private storage unit in response to a data request that did not indicate a need to modify the requested data portion. If invalidation requests need to be transmitted for data portion 934, then the two high-order private storage units 906 will receive a transmission when, it is possible that only one of the two private storage units may actually need to invalidate their data portions.

Data portion 936 has a status encoding of I and a presence encoding of 00 indicating that data portion 936 has been invalidated in shared storage and any private storage which may have previously held a copy.

Data portion 937 and data portion 973 have status encodings of EC and presence encodings of 01 indicating that these data portions have both been provided to at least one of the low-order private storage units 905 in response to data requests that did not indicate a need to modify the requested data portion. If invalidation requests need to be transmitted for either of these data portions, then two of the private storage units will receive a transmission when, it is possible that only one of the two private storage units may actually need to invalidate their data portions.

It will be appreciated that elements such as protocols and communication methods can be modified in arrangement and detail by those skilled in the art without departing from the principles of the present invention within the scope of the accompanying claims. For instance, distributed storage systems and distributed coherence protocols may enjoy the benefits of reduced backward inquiries and locally shared control consolidation.

FIG. 9d illustrates another alternative embodiment of a coherent storage hierarchy in a networked distributed system including private storage 901, private storage 902, private storage 904, private storage 908, and shared storage 990 that supports resolving sharing ambiguities. Control 994 includes a status portion and a presence portion for each corresponding data portion stored by shared storage 990. The status portion of control 994 holds a status encoding, which includes one exclusive-dirty status. The presence portion of control 994 holds a presence encoding, which comprises a doubly linked SCI list.

For example a status portion corresponding to data portion 951 holds a status encoding of ED and a corresponding presence portion holds a presence encoding for list51 indicating that data portion 951 has been provided to the private storage at the head of list51 in response to a data request of a type that indicates a need to modify the requested data portion. Data portion 953 has a status encoding of ED and a presence encoding for list53 indicating that data portion 953 has been provided to the private storage at the head of list53 in response to a data request that indicated a need to modify the requested data portion. Data portion 955 has a status encoding of ED and a presence encoding for list55 indicating that data portion 955 has been provided to the private storage at the head of list55 in response to a data request that indicated a need to modify the requested data portion. Data portion 958 has a status encoding of ED and a presence encoding for list58 indicating that data portion 958 has been provided to the private storage at the head of list58 in response to a data request that indicated a need to modify the requested data portion.

Data portion 952 has a status encoding of S and a presence encoding for list52 indicating that data portion 952 has been provided to the private storage units of list52 in response to data requests of a type that does not indicate a need to modify the requested data portion. Data portion 959 has a status encoding of S and a presence encoding for list59 indicating that data portion 959 has been provided to the private storage units of list59 in response to data requests of a type that does not indicate a need to modify the requested data portion.

Data portion 954 has a status encoding of M and a presence encoding for list54 indicating that previously modified data portion 954 has been provided the private storage units of list54 in response to a data request of a type that does not indicate a need to modify the requested data portion.

Data portion 956 has a status encoding of I indicating that data portion 956 has been invalidated in shared storage and a presence encoding for list56, which may or may not be significant. It will be appreciated that in a distributed system some delay may be expected to invalidate private storage copies and that it may be convenient to hold some information in presence encoding list56, but in general a status encoding of I indicates that no valid data or presence encodings are available for the corresponding storage location.

Data portion 957 has a status encoding of EC and a presence encoding for list57 indicating that data portion 957 has been provided exclusively to the private storage at the head of list57 in response to a data request of a type that does not indicate a need to modify the requested data portion. Data portion 974 has a status encoding of EC and a presence encoding for list74 indicating that data portion 974 has been provided exclusively to the private storage at the head of list74 in response to a data request of a type that does not indicate a need to modify the requested data portion.

Figure 10:
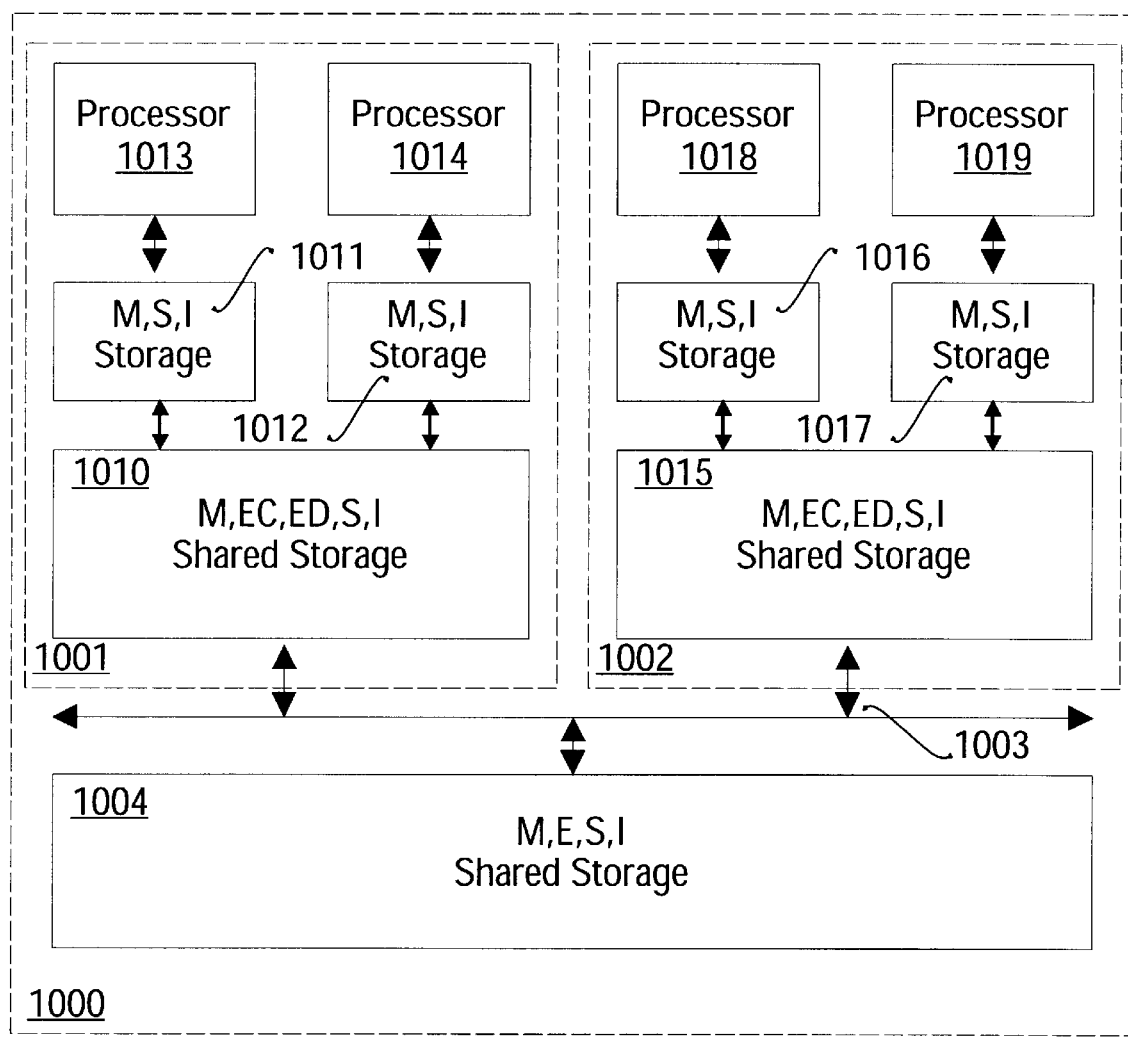
FIG. 10 illustrates an embodiment of a computing system including a coherent storage hierarchy comprising private storage using a first coherence protocol, shared storage using a second coherence protocol that supports resolving sharing ambiguities and shared storage using bus snooping and a third coherence protocol.

FIG. 10 illustrates an embodiment of a computing system 1000 including a coherent storage hierarchy comprising private storage 1011, 1012, 1016 and 1017 using an M-S-I coherence protocol, shared storage 1010 and 1015 using an M-ED-EC-S-I coherence protocol that supports resolving sharing ambiguities and shared storage 1004 using bus snooping on a shared bus 1003 and an M-E-S-I coherence protocol. Multiprocessing systems 1001 and 1002 may be on a single or on multiple printed circuit boards. Alternatively, multiprocessing systems 1001 and 1002 may be on a multiple-processor-core silicon die, or in a multi-chip module.

Figure 11:
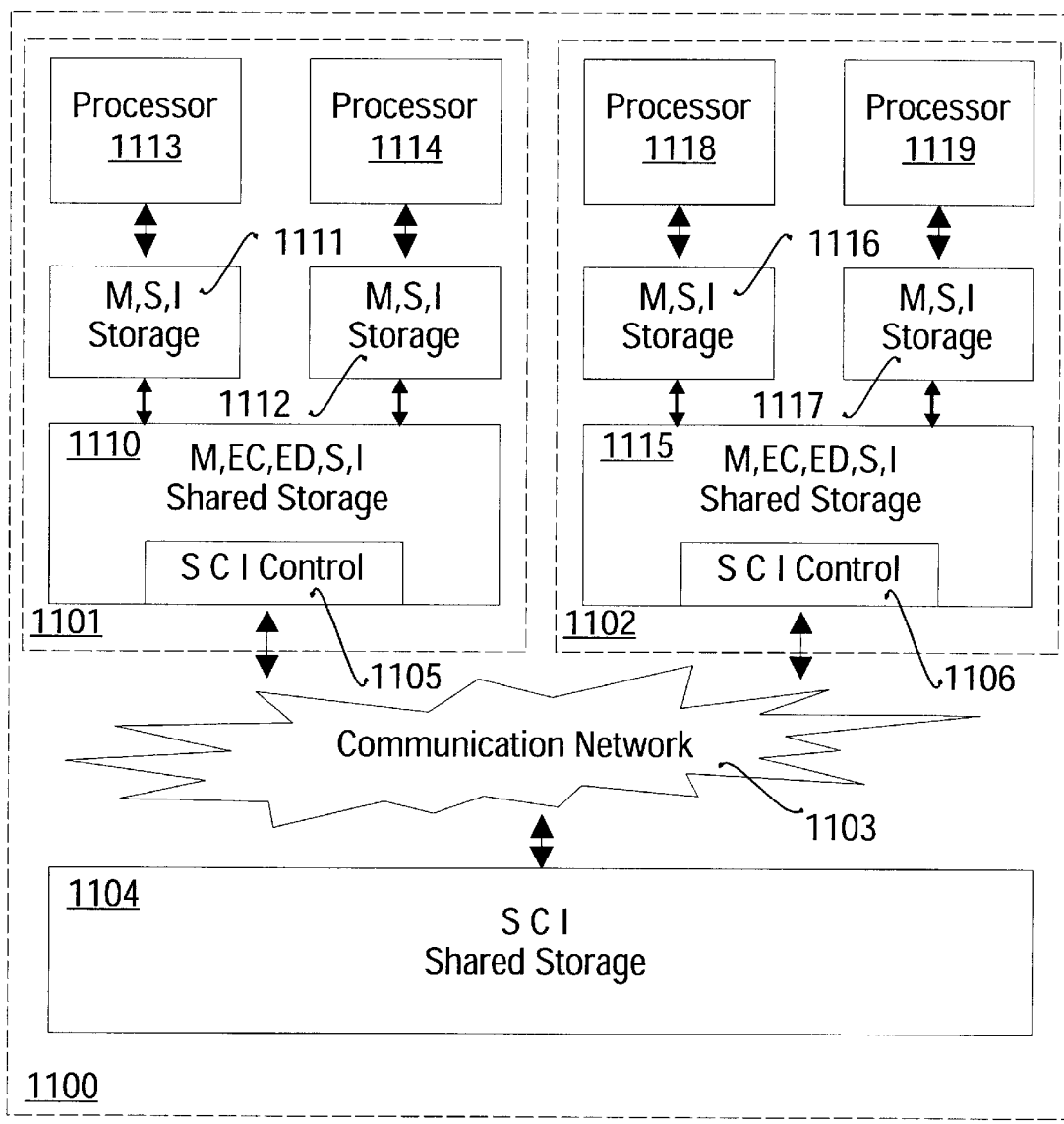
FIG. 11 illustrates another embodiment of a computing system including a coherent storage hierarchy comprising private storage using a first coherence protocol, shared storage using a second coherence protocol that supports resolving sharing ambiguities and distributed shared storage using a third coherence protocol.

FIG. 11 illustrates another embodiment of a computing system 1100 including a coherent storage hierarchy comprising private storage 1111, 1112, 1116 and 1117 using an M-S-I coherence protocol, shared storage 1110 and 1115 using an M-ED-EC-S-I coherence protocol that supports resolving sharing ambiguities and distributed shared storage 1104 using an SCI coherence protocol. Multiprocessing systems 1101 and 1102 may be arranged so as to appear to be single processor systems to each other and to shared storage 1104 when communication via communication network 1103.

Figure 12:
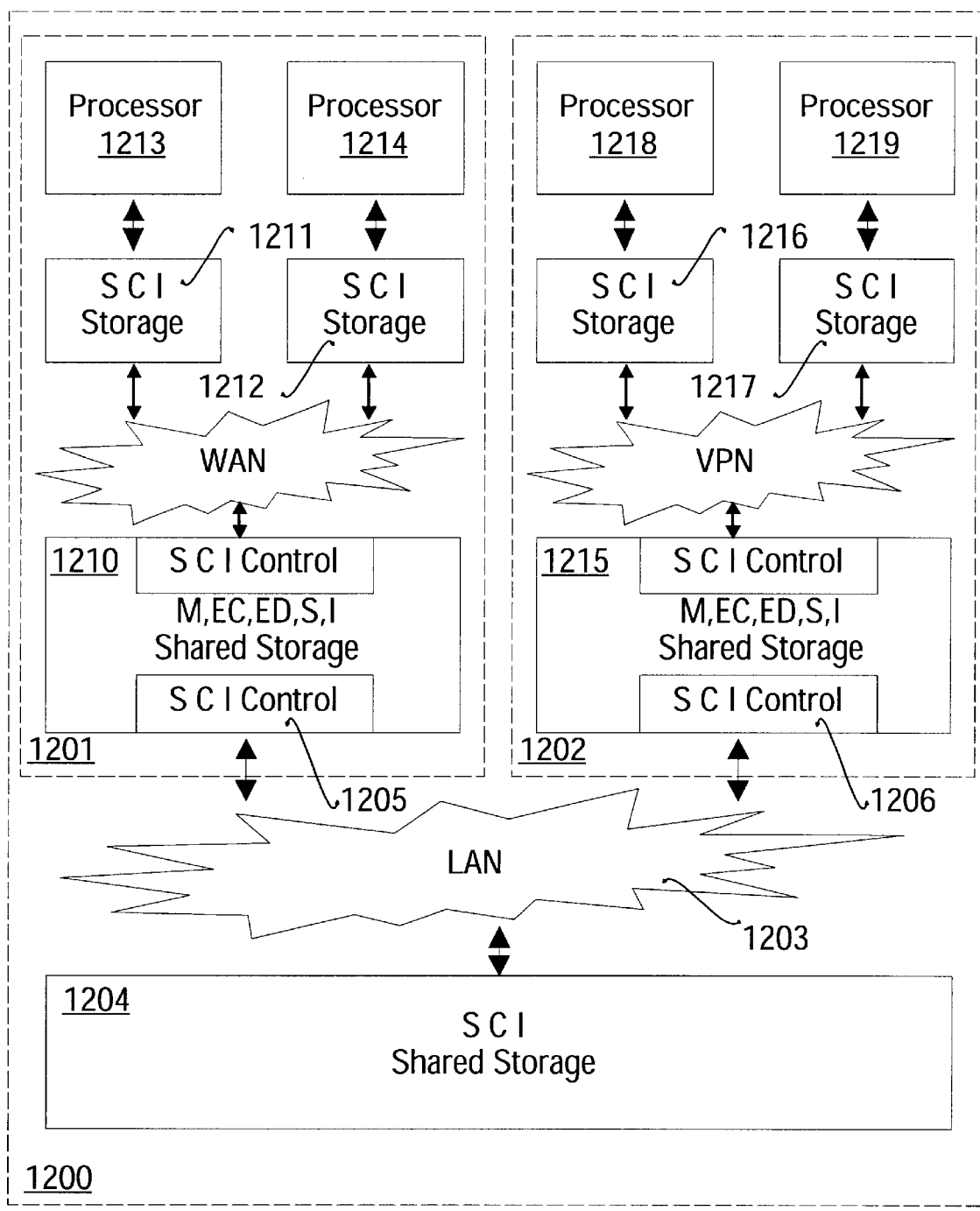
FIG. 12 illustrates another embodiment of a computing system including a coherent storage hierarchy comprising private storage using a distributed coherence protocol, distributed shared storage also using a distributed coherence protocol, and distributed shared storage using a second coherence protocol that supports exclusive locally isolated ownership while resolving sharing ambiguities.

FIG. 12 illustrates another embodiment of a computing system 1200 including a coherent storage hierarchy comprising private storage 1211, 1212, 1216 and 1217 using a distributed SCI coherence protocol, distributed shared storage 1204 also using a distributed SCI coherence protocol, and distributed shared storage 1210 and 1215 using an M-ED-EC-S-I coherence protocol that supports exclusive locally isolated ownership while resolving sharing ambiguities. Multiprocessing systems 1201 and 1202 may be arranged in a manner similar to that shown in FIG. 9d. Multiprocessing systems 1201 and 1202 may also be arranged so as to appear to be single processor systems to each other and to shared storage 1204 when communication via local area network (LAN) 1203. Multiprocessing systems 1201 and 1202 may provide different types of access to shared storage 1204. For instance, multiprocessing system 1201 may provide a more public access over a wide area network (WAN), while multiprocessing system 1202 may provide a more secure access over a virtual private network (VPN).

Figure 13A:
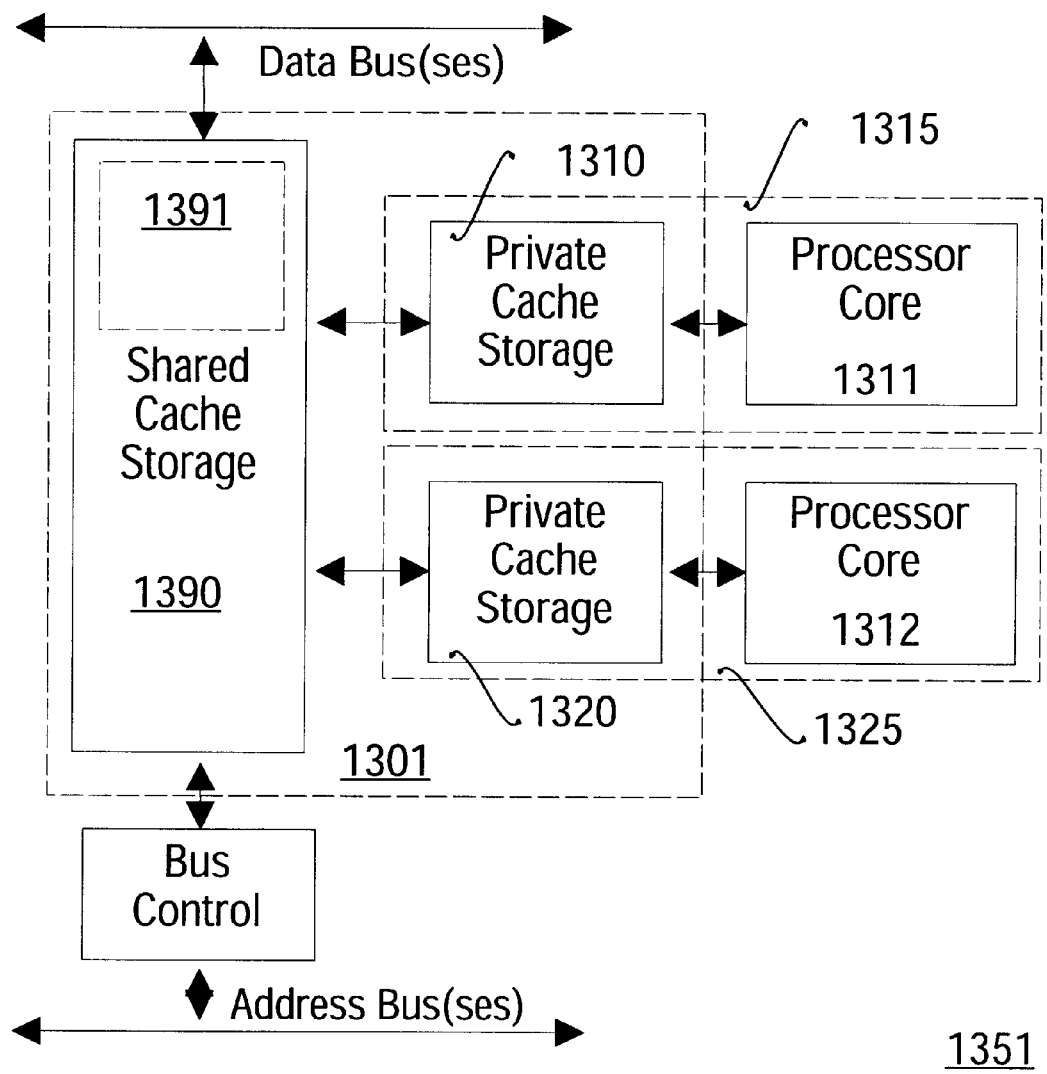
FIG. 13a illustrates an embodiment of a multiple-core processor including a coherent storage hierarchy comprising private storage and shared storage that supports resolving sharing ambiguities.
Figure 13B:
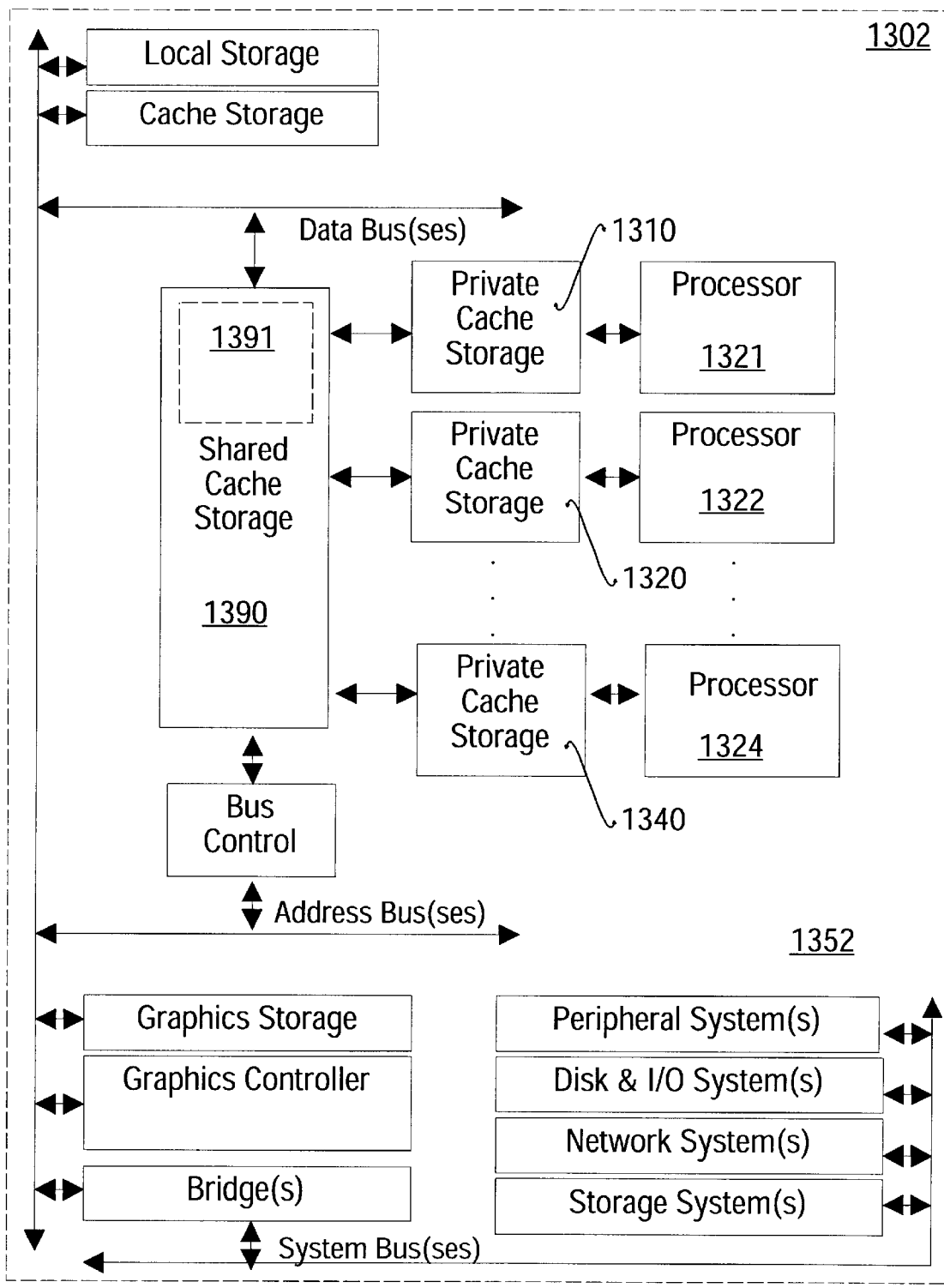
FIG. 13b illustrates another embodiment of a computing system including a coherent storage hierarchy comprising private storage and shared storage that supports resolving sharing ambiguities.

It will be appreciated that the methods and apparatuses herein disclosed may be used in multiple user multiprocessing systems or in single user multiprocessing systems or in multiple core processor. FIG. 13a illustrates an embodiment of multiple core processor 1351 including a coherent storage hierarchy 1301 comprising private storage 1310, private storage 1320 and shared storage 1390 having storage control 1391 that supports resolving sharing ambiguities. Private storage 1310 and private storage 1320 correspond to processor core 1311 and processor core 1312 respectively. Processor core 1311 and private storage 1310 may be closely integrated into a combined processing core 1315. Similarly processor core 1312 and private storage 1320 may be closely integrated into a combined processing core 1325. It will be appreciated that multiple core processor 1351 may comprise a single die or may comprise multiple dies and that processing core 1315 may be similar or dissimilar to processing core 1325. It will also be appreciated multiple core processor 1351 may further comprise bus control circuitry or other communication circuitry, processor cores in addition to processor cores 1311 and 1312 and private storage in addition to private storage 1310 and 1320. FIG. 13b further illustrates an embodiment of computing system 1302 including a coherent storage hierarchy comprising private storage 1310, 1320, . . . 1340 and shared storage 1390 having storage control 1391 that supports resolving sharing ambiguities. Private storage 1310, 1320, . . . 1340 correspond to processors 1321, 1322, . . . 1340 respectively. Computing system 1302 may comprise a personal computer including but not limited to central processing 1352, graphics storage, other cache storage and local storage; system bus(ses), local bus(ses) and bridge(s); peripheral systems, disk and input/output systems, network systems and storage systems.

The above description is intended to illustrate preferred embodiments of the present invention. From the discussion above it should also be apparent that the invention can be modified in arrangement and detail by those skilled in the art without departing from the principles of the present invention within the scope of the accompanying claims.

What is claimed is:

1. An apparatus comprising:
   a first data storage unit including a data portion to hold a first data encoding and a corresponding status portion to hold a first status encoding of the corresponding data portion; and
   a first storage control coupled to the first data storage unit to receive a first data request and to transmit the first data encoding in response to the first data request if the first status encoding is one of a set of clean status encodings and to transmit a second data request if the first status encoding is one of a set of exclusive dirty status encodings.

2. The apparatus of claim 1, the first data storage unit further including:
   a presence portion corresponding to the data portion and the status portion to hold a first presence encoding of the corresponding data portion.

3. The apparatus of claim 1 further comprising:
   a second data storage unit to receive the first data from the first data storage unit; and
   a third data storage unit to transmit a second data in response to the second data request from the first data storage unit.

4. The apparatus of claim 3 wherein the first data storage unit is shared storage.

5. The apparatus of claim 3 wherein the second data storage unit and the third data storage unit are private storage.

6. The apparatus of claim 5 wherein the first data storage unit, the second data storage unit and the third data storage unit are on the same die.

7. The apparatus of claim 5 wherein the second data storage unit and the third data storage unit are distributed storage.

8. An apparatus comprising:
   a first processor to transmit a first data request;
   a plurality of data storage units correspondingly coupled to the plurality of processors;
   a first data storage unit of the plurality of data storage units corresponding to the first processor, the first data storage unit having a first data portion to hold a first data encoding, a corresponding first status portion to hold a first status encoding, and a first storage control to transmit the first data encoding in response to the first data request if the first status encoding is one of a set of valid status encodings and to transmit a second data request if the first status encoding is one of a set of invalid status encodings;
   a second data storage unit coupled with the first processors, the second data storage unit having a second data portion to hold a second data encoding, a second status portion to hold a second status encoding of the corresponding second data portion, and a second storage control to receive the second data request and to transmit the second data encoding in response to the second data request if the second status encoding is one of a set of clean status encodings and to transmit a third data request if the second status encoding is one of a set of exclusive dirty status encodings; and
   a third data storage unit of the plurality of data storage units having a third data portion to hold a third data encoding and having a third storage control to transmit the third data encoding in response to the third data request.

9. The apparatus of claim 8, the second data storage unit further including:
   a second presence portion corresponding to the second data portion to hold a presence encoding of the corresponding second data portion.

10. The apparatus of claim 9 wherein the presence encoding indicates the third data storage unit when the third data storage unit holds a copy of the second data encoding.

11. The apparatus of claim 10 wherein the presence encoding indicates only the third data storage unit when the third data storage unit holds a modified copy of the second data encoding.

12. The apparatus of claim 8 wherein the second data storage unit is shared storage.

13. The apparatus of claim 8 wherein the first data storage unit and the third data storage unit are private storage.

14. The apparatus of claim 13 wherein the first data storage unit, the second data storage unit and the third data storage unit are on the same die.

15. The apparatus of claim 13 wherein the first data storage unit and the third data storage unit are distributed storage.

16. An apparatus comprising:
a first data storage unit having a data portion, a corresponding status portion to hold a first status encoding and a corresponding presence portion to hold a first presence encoding of the corresponding data portion; and
a first storage control coupled to the first data storage unit to receive a first data request of a first request type and in response to the first data request to transmit an invalidation request according to the first presence encoding if the first status encoding is one of a set of valid status encodings and to set the first status encoding to one of a set of exclusive dirty status encodings.

17. The apparatus of claim 16 wherein the first storage control, in response to the first data request of a first request type, is to set the first presence encoding to indicate an originator of the first data request.

18. The apparatus of claim 17 wherein the first request type is a request to modify the requested data.

19. An apparatus comprising:
shared storage means for storing a data portion;
shared status recording means for encoding an exclusive dirty status corresponding to the data portion;
a plurality of private storage means for storing private copies of modified and unmodified data portions;
control means for maintaining coherence of data portions between private storage means and shared storage means.

20. The apparatus of claim 19, further comprising:
presence recording means for encoding a location of a copy of the corresponding data portion.

21. The apparatus of claim 20 wherein the location encoding indicates only one location if the copy of the data portion is permitted to be modified.

22. The apparatus of claim 20 wherein maintaining coherence includes requesting invalidation of a copy of a data portion by a private storage indicated by a presence encoding corresponding to the data portion if it is being permitted to be modified.

23. The apparatus of claim 19 wherein maintaining coherence includes requesting an updated copy of a data portion from a private storage in response to a request for the data portion if it has a corresponding exclusive dirty status.

24. A method comprising:
transmitting a data portion encoding in response to a first data request if a corresponding data portion status is one of a set of clean status encodings;
transmitting a second data request if the corresponding data portion status is one of a set of exclusive dirty status encodings;
transmitting an invalidation request according to a presence encoding of the corresponding data portion if the first data request is of a first request type and if the data portion status is one of a set of valid status encodings; and
setting the data portion status to one of a set of dirty status encodings if the first data request is of the first request type.

25. The method of claim 24 further comprising:
setting the presence encoding to indicate an originator of the first data request if the first data request is of the first request type.

26. The method of claim 25 wherein the first request type is a request to modify the requested data and the presence encoding is set to indicate only one originator.

27. A state machine executable encoding of a method comprising one or more code storage medium having executable encodings stored thereon which, when executed by one or more state machines, causes the one or more state machine to:
transmit a data portion encoding in response to a first data request if a corresponding data portion status is one of a set of clean status encodings;
transmit a second data request if the corresponding data portion status is one of a set of exclusive dirty status encodings;
transmit an invalidation request if the first data request is of a first request type and if the data portion status is one of a set of valid status encodings; and
set the data portion status to one of a set of dirty status encodings if the first data request is of the first request type.

28. The state machine executable encoding of a method recited in claim 27 wherein the invalidation request is transmitted according to a corresponding data portion presence encoding.

29. The state machine executable encoding of a method recited in claim 27, wherein the executable encodings further cause the one or more state machine to:
set the presence encoding to indicate an originator of the first data request if the first data request is of the first request type.

30. The state machine executable encoding of a method recited in claim 27, wherein the first request type is a request to modify the requested data and the presence encoding is set to indicate only one originator.

* * * * *